(12) United States Patent
Iwasaki

(10) Patent No.: US 9,183,187 B2
(45) Date of Patent: Nov. 10, 2015

(54) ADVERTISEMENT DISPLAY PROGRAM, ADVERTISEMENT DISPLAY APPARATUS, ADVERTISEMENT DISPLAY METHOD, RECORDING MEDIUM, AND ADVERTISEMENT DISPLAY SYSTEM

(75) Inventor: Narutaka Iwasaki, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/824,875

(22) PCT Filed: Sep. 28, 2011

(86) PCT No.: PCT/JP2011/072231
§ 371 (c)(1),
(2), (4) Date: Mar. 18, 2013

(87) PCT Pub. No.: WO2012/043649
PCT Pub. Date: Apr. 5, 2012

(65) Prior Publication Data
US 2013/0179262 A1     Jul. 11, 2013

(30) Foreign Application Priority Data
Sep. 29, 2010 (JP) .................... 2010-218753

(51) Int. Cl.
G06Q 30/00 (2012.01)
G06F 17/22 (2006.01)
G06Q 30/02 (2012.01)
G06F 17/30 (2006.01)

(52) U.S. Cl.
CPC ...... *G06F 17/2235* (2013.01); *G06F 17/30893* (2013.01); *G06Q 30/02* (2013.01); *G06Q 30/0241* (2013.01); *G06Q 30/0256* (2013.01)

(58) Field of Classification Search
CPC .................................. G06Q 30/0256
USPC .................................. 705/14.54
See application file for complete search history.

(56) References Cited

U.S. PATENT DOCUMENTS

2006/0293951 A1* 12/2006 Patel et al. ............. 705/14
2008/0028064 A1* 1/2008 Goyal et al. ........... 709/224
2009/0197580 A1* 8/2009 Gupta et al. ........... 455/414.2

FOREIGN PATENT DOCUMENTS

| JP | 2002-312668 A | 10/2002 |
| JP | 2006-098888 A | 4/2006 |
| JP | 2007-219595 A | 8/2007 |
| JP | 2009-080535 A | 4/2009 |
| JP | 2009-187473 A | 8/2009 |
| JP | 2010-165171 A | 7/2010 |
| WO | 01/80075 A1 | 10/2001 |

* cited by examiner

*Primary Examiner* — John G Weiss
*Assistant Examiner* — Scott C Anderson
(74) *Attorney, Agent, or Firm* — Sughrue Mion, PLLC

(57) ABSTRACT

Advertisement information (45, 46) and a character string which is set in advance are stored in association with each other (S2), display data are obtained (S3), link information including a character string is specified from among link information included in the obtained display data (S8), a display position 42 for displaying the specified link information is specified (S9), an advertisement display area for displaying advertisement information is specified on the basis of the specified display position (S10), advertisement information corresponding to a character string included in the specified link information is specified (S11), and the specified advertisement information is displayed in the specified advertisement display area (43, 44) (S14).

23 Claims, 16 Drawing Sheets

ADVERTISEMENT DISPLAY PROGRAM, ADVERTISEMENT DISPLAY APPARATUS, ADVERTISEMENT DISPLAY METHOD, RECORDING MEDIUM, AND ADVERTISEMENT DISPLAY SYSTEM

CROSS REFERENCE TO RELATED APPLICATIONS

This application is a National Stage of International Application No. PCT/JP2011/072231 filed on Sep. 28, 2011, which claims priority from Japanese Patent Application No. 2010-218753, filed on Sep. 29, 2010, the contents of all of which are incorporated herein by reference in their entirety.

TECHNICAL FIELD

The present invention relates to a technical field of an advertisement display program, an advertisement display apparatus, an advertisement display method, a recording medium, and an advertisement display system for displaying advertisement on a web page.

BACKGROUND ART

Advertisements on the Internet include various kinds of forms such as a banner advertisement, a mail advertisement, a keyword targeted advertisement, and an affiliate advertisement, and in order to enhance the effect of the advertisement, the advertisement may be displayed at a position which can be easily noticed by users, or the advertisement may be blinked, or incentive is given to encourage users to access the advertisement. For example, Patent Document 1 discloses a prize service method for performing prize processing in accordance with the state of access by a user to a web site, wherein when the user accesses one of multiple web sites, winning determination is output with a predetermined winning chance, and when the winning determination is output, a banner advertisement included in the web page accessed by the user is changed to a winning banner including a display of the winning determination.

CITATION LIST

Patent Document

Patent Document 1: Japanese Patent Application Laid-Open No. 2009-80535

SUMMARY OF THE INVENTION

Problem to be Solved by the Invention

In the past, however, the banner advertisement and the like is fixed at a display position of a web page, and therefore, as the user gets accustomed to the banner advertisement, the effect of appealing to the user is reduced. Accordingly, it is difficult to display the advertisement in an efficient manner.

The present invention is made in view of such problem, and it is an example of object of the present invention to provide an advertisement display program, an advertisement display apparatus, an advertisement display method, a recording medium, and an advertisement display system for enhancing the effect of advertisement in a web page and the like.

Means for Solving the Problem

In order to solve the above problem, the invention according to claim 1 causes a computer to execute a storing step of storing advertisement information and a character string which is set in advance in association with each other, a display data obtaining step of obtaining display data, a link information specifying step of specifying link information including the character string from among link information included in the obtained display data, a display position specifying step of specifying a display position where the specified link information is displayed, an advertisement display area specifying step of specifying an advertisement display area for displaying advertisement information on the basis of the specified display position, an advertisement information specifying step of specifying advertisement information corresponding to a character string included in the specified link information, and an advertisement information display step of displaying the specified advertisement information in the specified advertisement display area.

In the advertisement display program according to claim 1, the invention according to claim 2 is characterized in that in the advertisement display area specifying step, a blank area in proximity to the display position is specified as the advertisement display area.

In the advertisement display program according to claim 1, The invention according to claim 3 is characterized in that in the advertisement display area specifying step, a rectangular area including link information and information related to the link information is specified as the advertisement display area.

In the advertisement display program according to any one of claims 1 to 3, the invention according to claim 4 is characterized in that the invention according to claim 4 further includes an advertisement display determining step of determining whether the specified advertisement information is to be displayed or not in the advertisement information display step.

In the advertisement display program according to claim 4, the invention according to claim 5 is characterized in that in the advertisement display determining step, a determination as to whether the advertisement can be displayed or not is made on the basis of whether a link based on the link information is valid or not.

In the advertisement display program according to claim 4 or 5, the invention according to claim 6 is characterized in that the invention according to claim 6 further includes a character string storing step of storing a character string which is to be restricted from being displayed, and wherein, in the advertisement display determining step, a determination as to whether the advertisement can be displayed or not is made on the basis of whether a link destination based on the link information includes the stored character string or not.

In the advertisement display program according to any one of claims 4 to 6, the invention according to claim 7 is characterized in that the invention according to claim 7 further includes a similarity calculating step of calculating similarity of the character string, wherein, in the link information specifying step, link information including a character string similar to the character string is specified from among link information included in the obtained display data, and, in the advertisement display determining step, a determination as to whether the advertisement can be displayed or not is made on the basis of the similarity of the similar character string.

In the advertisement display program according to any one of claims 4 to 7, the invention according to claim 8 is characterized in that in the advertisement display determining step, the advertisement information is determined to be displayed when a number of times the advertisement information displayed on a web page satisfies a predetermined condition.

In the advertisement display program according to any one of claims 4 to 8, the invention according to claim 9 is characterized in that wherein in the storing step, a display time is further stored for each piece of advertisement information, and, in the advertisement display determining step, the advertisement information is determined to be displayed where a predetermined time or more elapses since a display time of the advertisement information when display of the advertisement is determined.

In the advertisement display program according to any one of claims 2 to 9, the invention according to claim 10 is characterized in that the invention according to claim 10 further includes a search step of receiving input of a search keyword, obtaining a search result in response to the search keyword, and displaying the search result, wherein, in the advertisement display determining step, the advertisement information is displayed on the basis of a result in the search step.

In the advertisement display program according to claim 10, the invention according to claim 11 is characterized in that in the advertisement display determining step, the advertisement information is determined to be displayed when the number of searches in the search step within a predetermined period of time is determined to be equal to or more than a threshold value.

In the advertisement display program according to claim 10 or 11, the invention according to claim 12 is characterized in that in the advertisement display determining step, the advertisement information is determined to be displayed when the number of times the advertisement information displayed in the web page included in a result set of search in the search step satisfies a predetermined condition.

In the advertisement display program according to any one of claims 1 to 12 the invention according to claim 13 is characterized in that in the advertisement information display step, the specified advertisement information is displayed for a predetermined display time.

In the advertisement display program according to any one of claims 1 to 13, the invention according to claim 14 is characterized in that the invention according to claim 14 further includes a display size change step of changing a display size of the specified advertisement information displayed in the advertisement display area.

The invention according to claim 15 includes a storing means that stores advertisement information and a character string which is set in advance in association with each other, a display data obtaining means that obtains display data, a link information specifying means that specifies link information including the character string from among link information included in the obtained display data, a display position specifying means that specifies a display position where the specified link information is displayed, an advertisement display area specifying means that specifies an advertisement display area for displaying advertisement information on the basis of the specified display position, an advertisement information specifying means that specifies advertisement information corresponding to a character string included in the specified link information, and an advertisement information display means that displays the specified advertisement information in the specified advertisement display area.

The invention according to claim 16 is an advertisement display method for an advertisement display apparatus that displays an advertisement, and the advertisement display method includes a storing step of storing advertisement information and a character string which is set in advance in association with each other, a display data obtaining step of obtaining display data, a link information specifying step of specifying link information including the character string from among link information included in the obtained display data, a display position specifying step of specifying a display position where the specified link information is displayed, an advertisement display area specifying step of specifying an advertisement display area for displaying advertisement information on the basis of the specified display position, an advertisement information specifying step of specifying advertisement information corresponding to a character string included in the specified link information, and an advertisement information display step of displaying the specified advertisement information in the specified advertisement display area.

The invention according to claim 17 is a computer-readable recording medium recorded with an advertisement display program for causing a computer to execute a storing step of storing advertisement information and a character string which is set in advance in association with each other, a display data obtaining step of obtaining display data displayed on the web page with the web browser, a link information specifying step of specifying link information including the character string from among link information included in the obtained display data, a display arrangement position specifying step of specifying a display position where the specified link information is displayed on the screen of the web page, an advertisement display area specifying step of specifying an advertisement display area for displaying advertisement information on the basis of the specified display position, an advertisement information specifying step of specifying advertisement information corresponding to a character string included in the specified link information, and an advertisement information display step of displaying the specified advertisement information in the specified advertisement display area.

The invention according to claim 18 is an advertisement display system comprising a terminal for displaying an advertisement and a server connected to the terminal via a network and presenting the advertisement, wherein the terminal includes a receiving means that receives advertisement information and a character string which is set in advance, a storage means that stores the character string and the advertisement information in association with each other, a display data obtaining means that obtains display data, a link information specifying means that specifies link information including the character string from among link information included in the obtained display data, a display position specifying means that specifies a display position where the specified link information is displayed, an advertisement display area specifying means that specifies an advertisement display area for displaying advertisement information on the basis of the specified display position, an advertisement information specifying means that specifies advertisement information corresponding to a character string included in the specified link information, and an advertisement information display means that displays the specified advertisement information in the specified advertisement display area.

Effect of the Invention

According to the present invention, advertisement information and a character string which is set in advance are stored in association with each other, display data are obtained, link information including a character string is specified from among link information included in the obtained display data, a display position for displaying the specified link information is specified, an advertisement display area for displaying advertisement information is specified on the basis of the specified display position, advertisement information corresponding to a character string included in the specified link information is specified, and the specified advertisement information is displayed in the specified advertisement display area, whereby the display position of the advertisement can be changed in accordance with the position of the specified link information in the web page, and therefore, the effect of the advertisement in a web page and the like can be enhanced.

MODES FOR CARRYING OUT THE INVENTION

Hereinafter, embodiments of the present invention will be explained with reference to drawings. In addition, the embodiments explained below are embodiments where the present invention is applied to an advertisement display system.

[1. Overview of Configuration and Function of Advertisement Display System]

First, configuration and general functions of an advertisement display system according to an embodiment of the present invention will be explained using FIG. 1.

Figure 1:
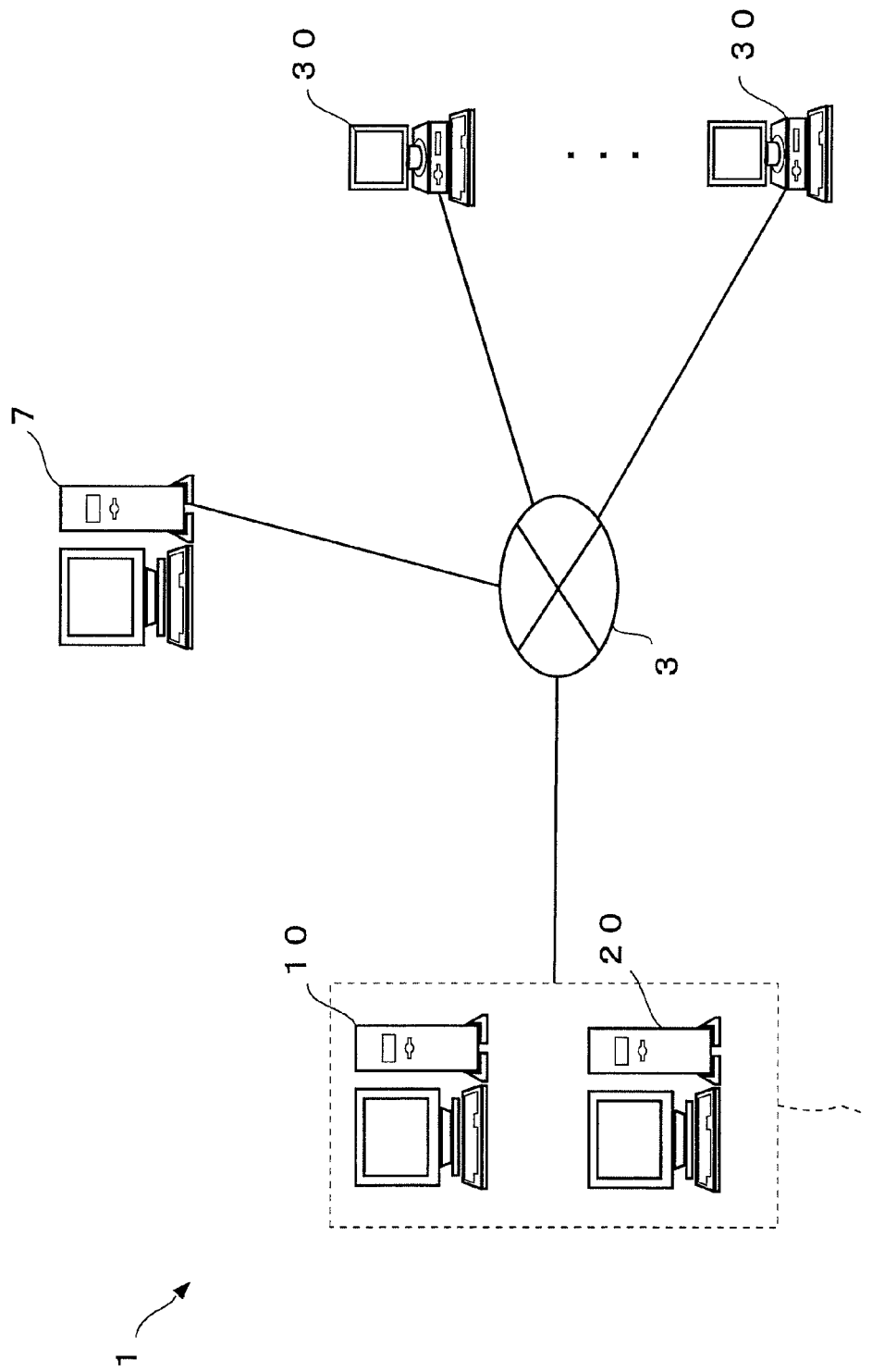
FIG. 1 is a schematic view illustrating an example of configuration of overview of an advertisement display system according to an embodiment of the present invention.

FIG. 1 is a schematic view illustrating an example of configuration of overview of an advertisement display system 1 according to the present embodiment.

As illustrated in FIG. 1, the advertisement display system 1 includes an advertisement providing server 10 (an example of a server) providing an advertisement, an information providing server 20 which is installed to run a shopping site used by users and which provides information about products and the like to users, and a terminal 30 displaying advertisement and the like.

The advertisement providing server 10 and the information providing server 20 are connected via a local area network and the like, and are configured to be able to transmit and receive data with each other, and the advertisement providing server 10 and the information providing server 20 constitute the server system 5. Further, the server system 5 and the terminal 30 are connected via a network 3, and are configured to transmit and receive data by communication protocol (for example, TCP/IP). In addition, the network 3 is established by, for example, the Internet, dedicated communication lines (for example, CATV line (Community Antenna Television) network), mobile communication networks (including base stations and the like), gateways, and the like.

The advertisement providing server 10 and the terminal 30 are connected via the network 3 to the search server 7. The search server 7 has a search database (not shown), and functions as a search engine on the Internet for searching on the basis of a search query given by the terminal 30.

The advertisement providing server 10 provides the terminal 30 with a character string and the like for specifying advertisement information displayed on a web page and link information related to the advertisement information.

The terminal 30 includes a web browser and a tool bar (an example of an advertisement display program) incorporated into a web browser or a web browser. The terminal 30 stores the advertisement information and the like given by the advertisement providing server 10, transmits the search query of the tool bar to the search server 7, and displays a search result and advertisement on the screen of the web browser.

[2. Configuration and Function of Each Server]

(2.1 Configuration and Function of Advertisement Providing Server 10)

Next, the configuration and function of the advertisement providing server 10 will be explained using FIG. 2.

Figure 2:
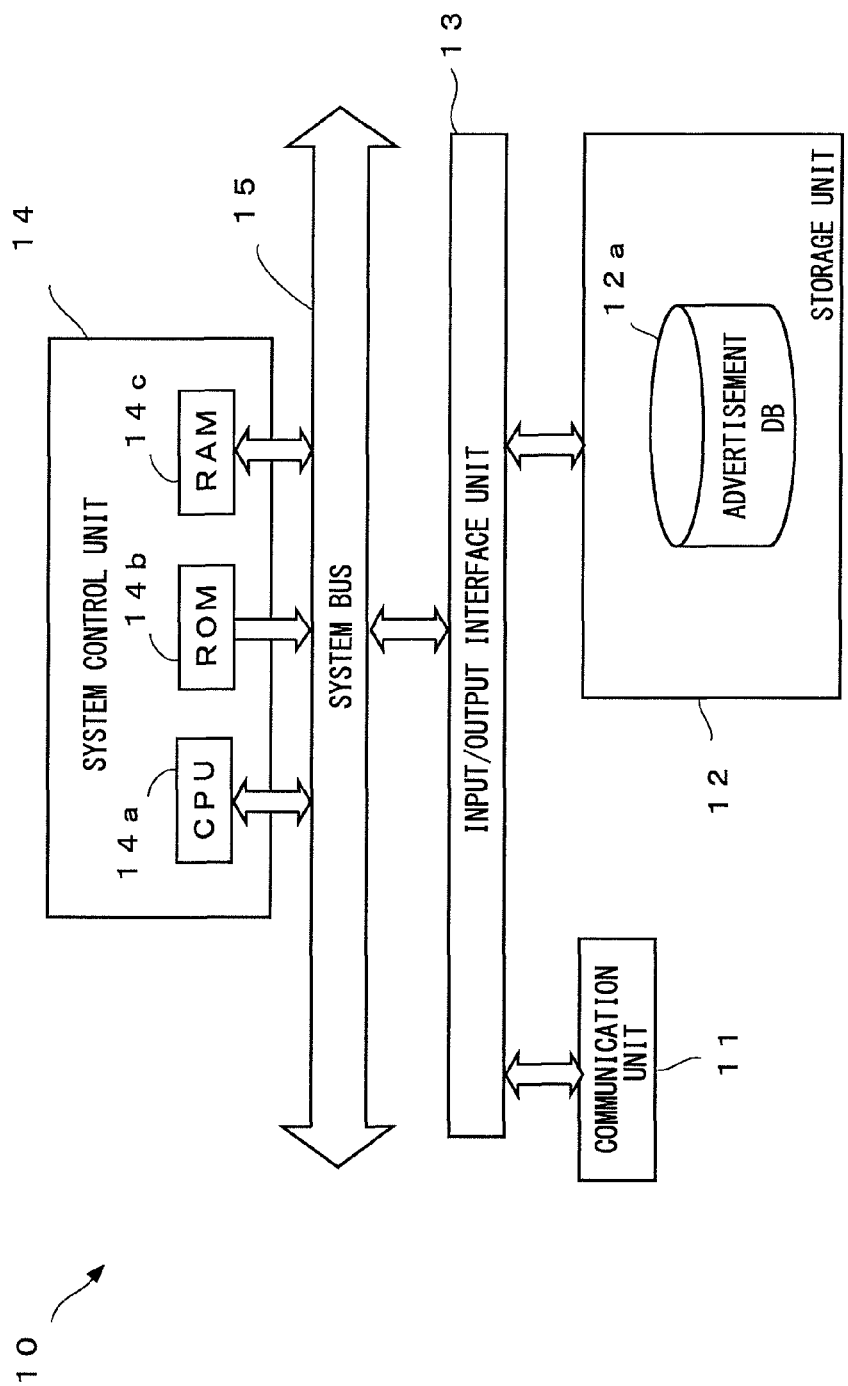
FIG. 2 is a block diagram illustrating an example of configuration of overview of an advertisement providing server of FIG. 1.

FIG. 2 is a block diagram illustrating an example of configuration of overview of the advertisement providing server 10.

As illustrated in FIG. 2, the advertisement providing server 10 functioning as a computer includes a communication unit 11, a storage unit 12, an input/output interface unit 13, and a system control unit 14. Further, the system control unit 14 and the input/output interface unit 13 are connected via a system bus 15.

The communication unit 11 is connected to the network 3, and controls the communication state with the terminal 30 and the like, and further, the communication unit 11 is connected to a local area network, and exchanges data with another server such as the information providing server 20 and the like on the local area network.

The storage unit 12 is constituted by, for example, a hard disk drive, and stores various kinds of programs and data such as an operating system and server programs. In addition, for example, various kinds of programs may be configured to be obtained by way of the network 3 from another server apparatus and the like, or alternatively, various kinds of programs may be configured to be recorded to a recording medium, and may be read by a means of a drive apparatus (not shown).

In the storage unit 12, an advertisement database (DB) 12a (hereinafter referred to as an "advertisement DB") and like are structured. The advertisement DB 12a stores, for example, advertisement information and character strings which are provided to the terminal 30.

In the advertisement DB 12a, the advertisement information and the character strings which are set in advance are stored in association with each other. Examples of character strings include character strings and the like related to the name of a company of an advertiser of the advertisement information or a domain name of a web site. Examples of advertisement information include the contents of display of the advertisement, link information, display control information of the advertisement, display time information of the advertisement, mode information of the advertisement, and advertisement attribute information. Examples of advertisement attribute information include color arrangement, a pattern, and a basic shape of the advertisement display, and the category of products advertised. Further, examples of display control information of the advertisement include information about a display basic size of the advertisement displayed on a web page and information about the change width of the maximum width and the minimum width for size change in the vertical or horizontal direction of the size of the advertisement. Further, examples of display time information about the advertisement include a time for which the displayed advertisement is continuously displayed, a waiting time until an advertisement which became in the non-display state is displayed again, and an advertisement display limitation time for limiting the display of the advertisement. Further, examples of mode information of the advertisement include pop-up advertisements and banner advertisements.

Next, the input/output interface unit 13 performs interface processing between the communication unit 11 and storage unit 12 and the system control unit 14.

The system control unit 14 includes, for example, a CPU (Central Processing Unit) 14a, a ROM (Read Only Memory) 14b, and a RAM (Random Access Memory) 14c. In the system control unit 14, the CPU 14a reads and executes various kinds of programs stored in the ROM 14b and the storage unit 12, whereby the system control unit 14 performs, e.g., processing for transmitting the advertisement information and the like to the terminal 30 and the like.

(2.2 Configuration and Function of Information Providing Server 20)

Next, the configuration and function of the information providing server 20 will be explained using FIG. 3.

Figure 3:
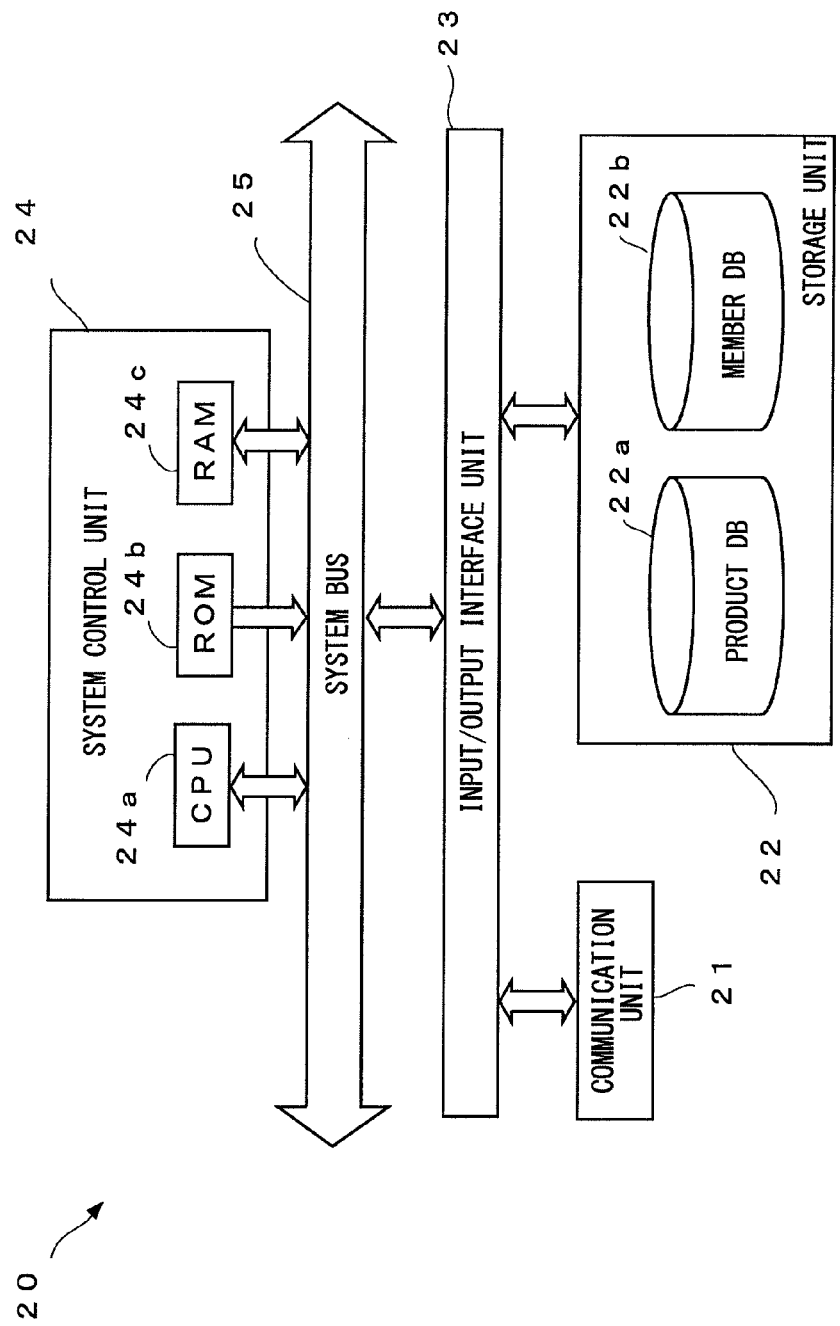
FIG. 3 is a block diagram illustrating an example of configuration of overview of an information providing server of FIG. 1.

FIG. 3 is a block diagram illustrating an example of configuration of overview of the information providing server 20.

As illustrated in FIG. 3, the information providing server 20 includes a communication unit 21, a storage unit 22, an input/output interface unit 23, and a system control unit 24, and the system control unit 24 and the input/output interface unit 23 are connected via a system bus 25. In addition, the configuration and function of the information providing server 20 are substantially the same as the configuration and function of the advertisement providing server 10, and accordingly, different features of each configuration and each function of the advertisement providing server 10 will be mainly explained.

For example, the communication unit 21 controls the communication state with the terminal 30, the advertisement providing server 10, and the like via the network 3 and local area network, and the like.

In the storage unit 22, for example, a product database (hereinafter referred to as "product DB") 22a and a member database (hereinafter referred to as "member DB") 22b are structured.

In association with a product ID which is an identifier for identifying a product, the product DB 22a stores the product name, the type, an image of the product, specifications, and product information, and also advertisement information and the like about each product. The product DB 22a also stores, for example, a file of a product web page described in a markup language and the like such as HTML (Hyper Text Markup Language) and XML (Extensible Markup Language).

The member DB 22b registers user information such as user ID, name, address, phone number, mail address, occupation, hobby, purchase history of a user (user of a shopping site) registered as a member, and theme or genre in which the user is interested. Further, the member DB 22b stores a user ID, a login ID, and a password which are required when the user logs into the shopping site using the terminal 30. Here, the login ID and the password are login information used in login processing (user's authentication processing).

The system control unit 24 includes a CPU 24a, a ROM 24b, a RAM 24c, and the like. In the system control unit 24, the CPU 24a reads and executes various kinds of program stored in the ROM 24b and the storage unit 22, and for example, records user's product purchase processing and purchase history of products for each user ID.

(2.3 Configuration and Function of Terminal 30)

Next, the configuration and function of the terminal 30 will be explained using FIG. 4.

Figure 4:
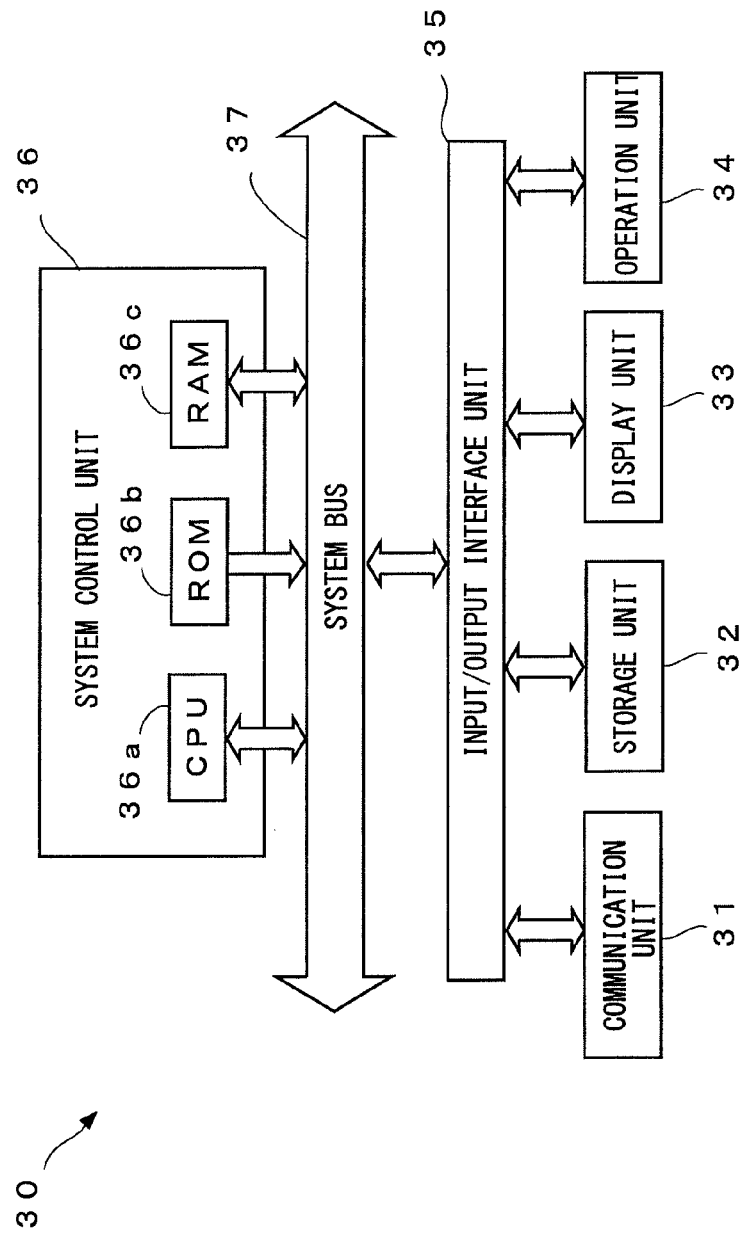
FIG. 4 is a block diagram illustrating an example of configuration of overview of a terminal of FIG. 1.

FIG. 4 is a block diagram illustrating an example of configuration of overview of the terminal 30.

As illustrated in FIG. 4, the terminal 30 functioning as a computer is, for example, a portable terminal such as portable radio phones and PDAs including a personal computer or a smartphone, and includes a communication unit 31, a storage unit 32, a display unit 33, an operation unit 34, an input/output interface unit 35, and a system control unit 36. Further, the system control unit 36 and the input/output interface unit 35 are connected via a system bus 37.

The communication unit 31 controls communication with the advertisement providing server 10 and the like via the network 3. In addition, when the terminal 30 is a portable radio phone, the communication unit 31 has a wireless communication function so that the communication unit 31 is connected to a mobile communication network of the network 3.

The storage unit 32 includes, for example, a hard disk drive, and stores an operating system, a program of a web browser, and a program of a tool bar for the web browser. The storage unit 32 stores advertisement information and a character string which is set in advance provided from the advertisement providing server 10 in association with each other.

The display unit 33 is constituted by, for example, a liquid crystal display device or an EL (Electro Luminescence) device. On the display unit 33, a web page obtained from the network is displayed with the web browser, and the advertisement information provided by the advertisement providing server 10 is displayed with the tool bar.

The operation unit 34 is constituted by, for example, a keyboard and a mouse. The user inputs a response using the operation unit 34. In addition, when the display unit 33 is a display panel of a touch-switch method such as a touch panel, the operation unit 34 obtains position information about a location where the screen of the display unit 33 is pressed.

The input/output interface unit 35 is an interface between the communication unit 31 and the storage unit 32 and the system control unit 36.

The system control unit 36 includes, for example, a CPU 36a, a ROM 36b, and a RAM 36c. In the system control unit 36, the CPU 36a reads and executes various kinds of program stored in the ROM 36b, the RAM 36c, and the storage unit 32.

For example, the system control unit 36 executes the program of the web browser to function as the web browser, or executes the program of the tool bar to function as the tool bar.

(2.4 Screen Configuration and Function of Web Browser and Tool Bar)

Next, the screen configuration and function of the web browser and the tool bar will be explained using FIG. 5.

Figure 5:
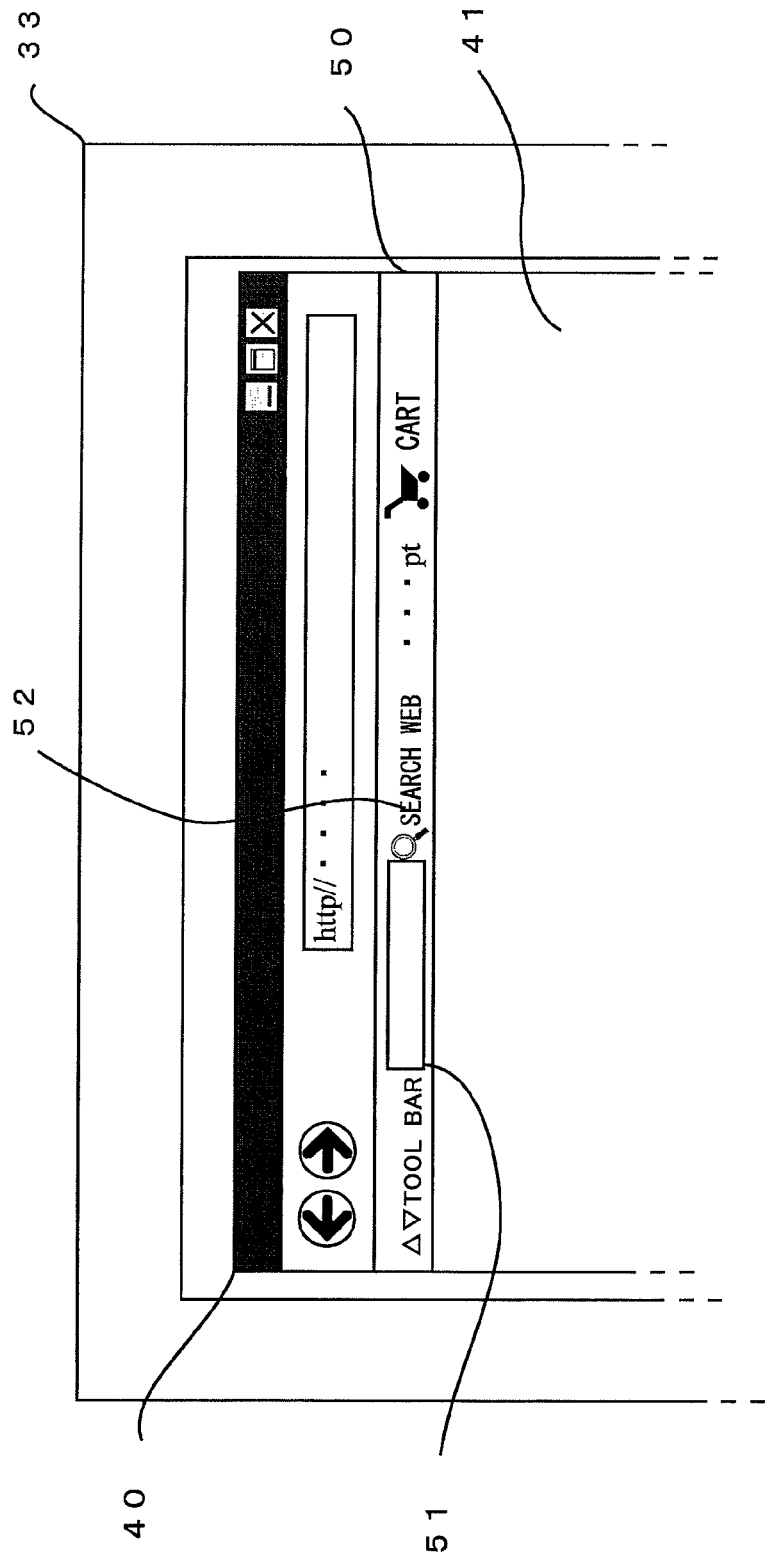
FIG. 5 is a schematic view illustrating an example of configuration of overview of a web browser and a tool bar displayed on the terminal of FIG. 1.

FIG. 5 is a schematic view illustrating an example of configuration of overview of the web browser and the tool bar displayed on the terminal 30.

As illustrated in FIG. 5, a web browser 40 displayed on the display unit 33 of the terminal 30 includes a web page display area 41 where a web page is displayed (an example of a screen of the web page). A tool bar 50 incorporated into the web browser 40 includes a search keyword input field 51 into which a search keyword is input, and includes a search button 52 for requesting search. Here, for example, the tool bar is some kind of menu in which buttons, boxes, and the like having functions are arranged in order to simplify the functions used by the user, and the tool bar is used while it is plugged into the web browser and the like.

The tool bar 50 has unique tool bar recognition information for recognizing the tool bar 50, and when the search is performed, the tool bar 50 transmits the tool bar recognition information to the advertisement providing server 10 and the like.

The web page display area 41 displays a web page and an advertisement. The search keyword input field 51 is a search box, and when the operation unit 34 is operated to specify the search keyword input field 51 (for example, the user uses the mouse to move the pointer displayed on the display unit 33 to the search box and clicks the search box), the web page display area 41 becomes ready to receive a search keyword which is input with the keyboard of the operation unit 34.

In response to specifying operation with the operation unit 34, the search button 52 functions as a search start button for performing operation to transmit the search keyword and the like, which is input into the search keyword input field 51, to the search server 7.

The tool bar 50 performs the search so that a found search result is displayed in the web page display area 41, and displays the advertisement information provided by the advertisement providing server 10 in a portion where the web page display area 41 is displayed on the display unit 33.

[3. Operation of Advertisement Display System]

Next, operation of the advertisement display system 1 according to the embodiment of the present invention will be explained using FIGS. 6 to 9.

Figure 6:
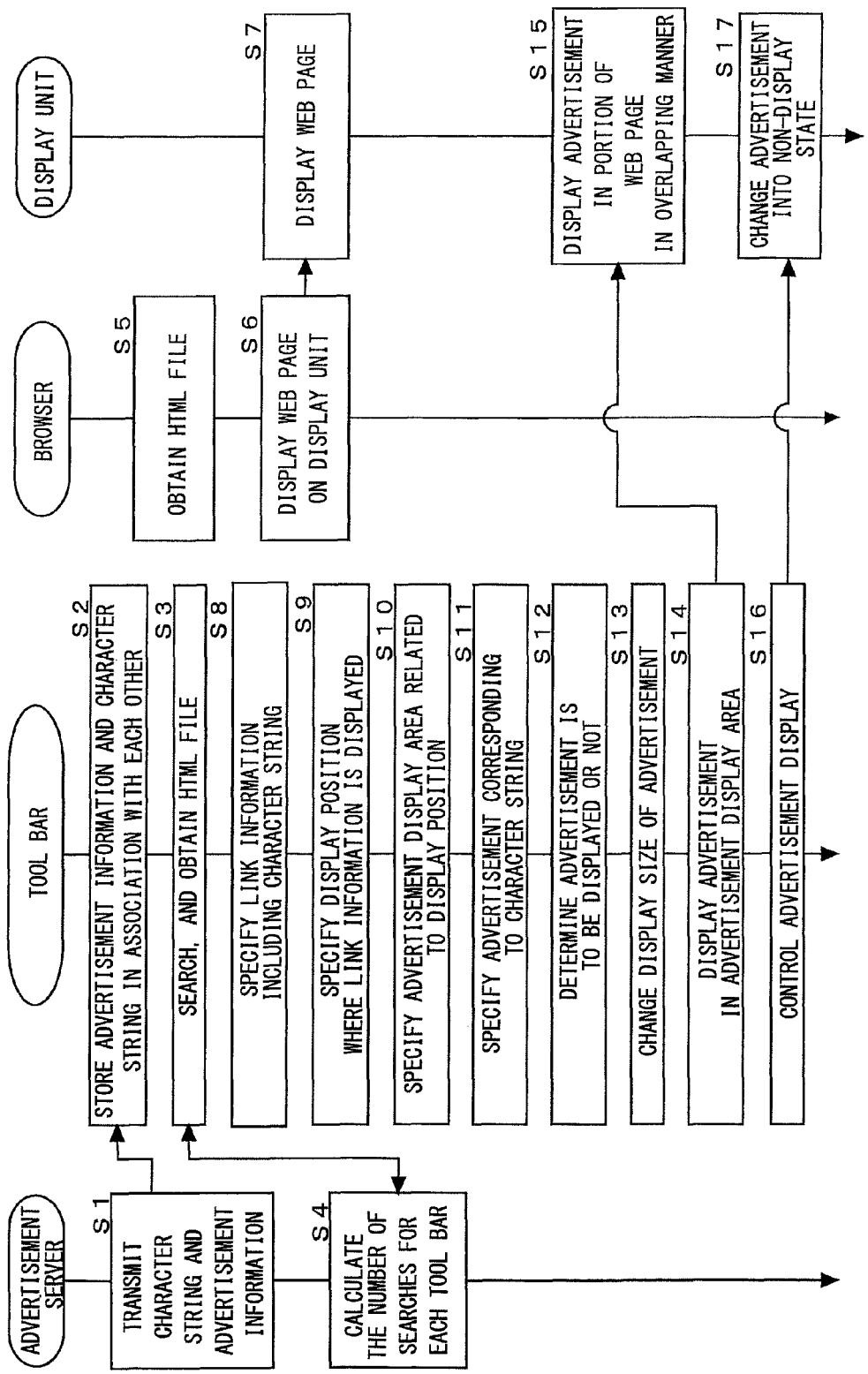
FIG. 6 is a sequence diagram illustrating an example of operation of an advertisement display system of FIG. 1.
Figure 7:
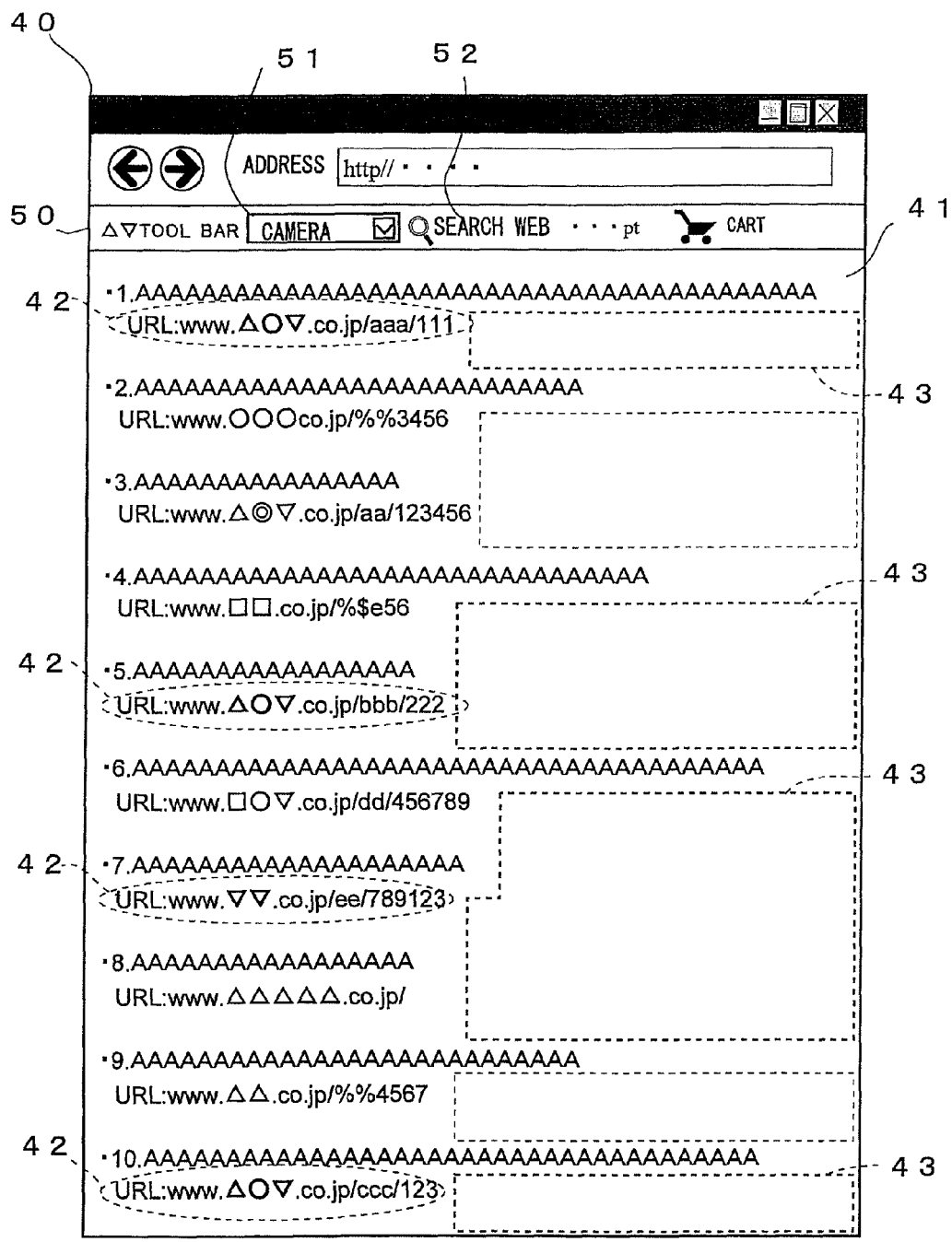
FIG. 7 is a schematic view illustrating an example of a web page displayed on the terminal of FIG. 1.
Figure 8:
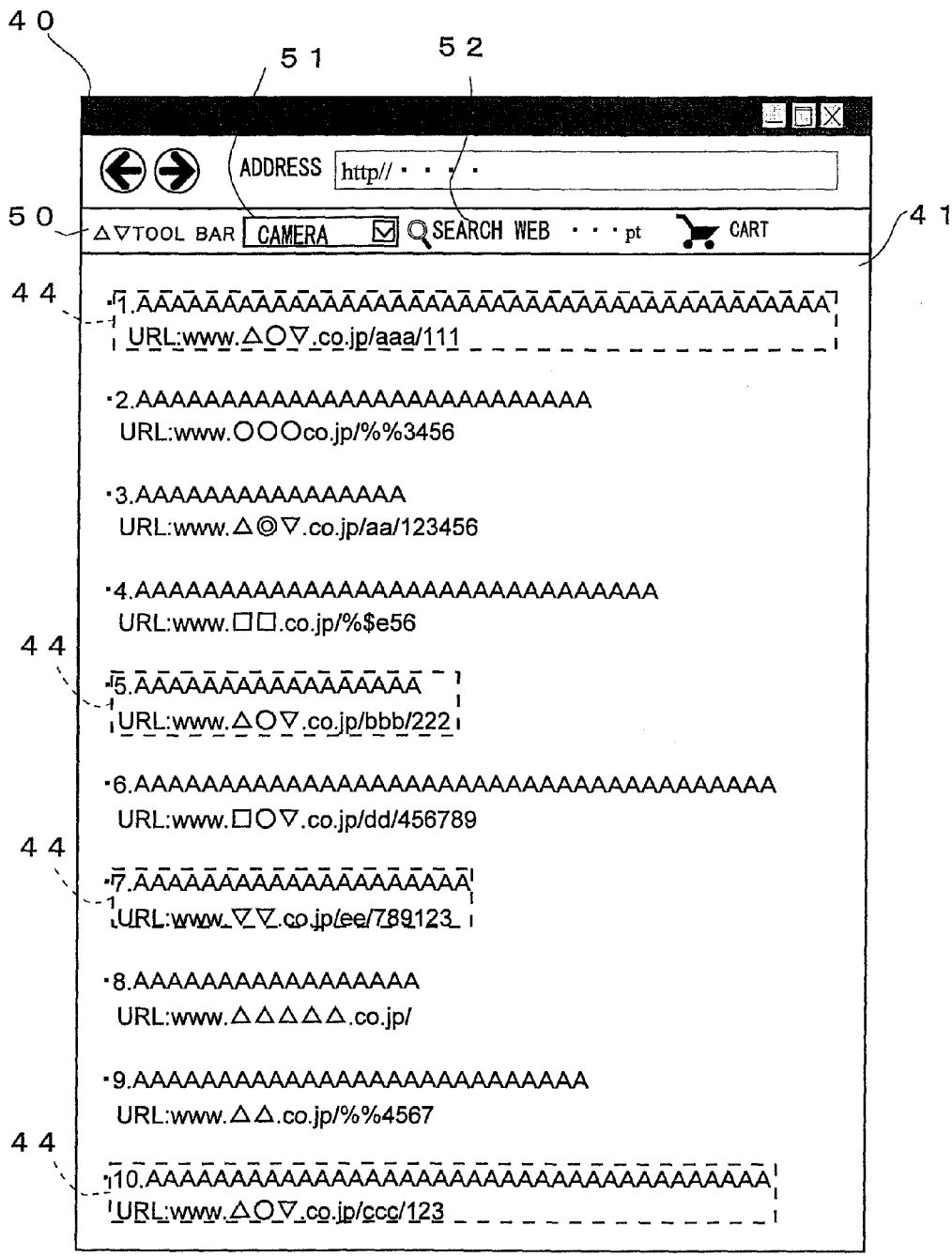
FIG. 8 is a schematic view illustrating an example of a web page displayed on the terminal of FIG. 1.
Figure 9:
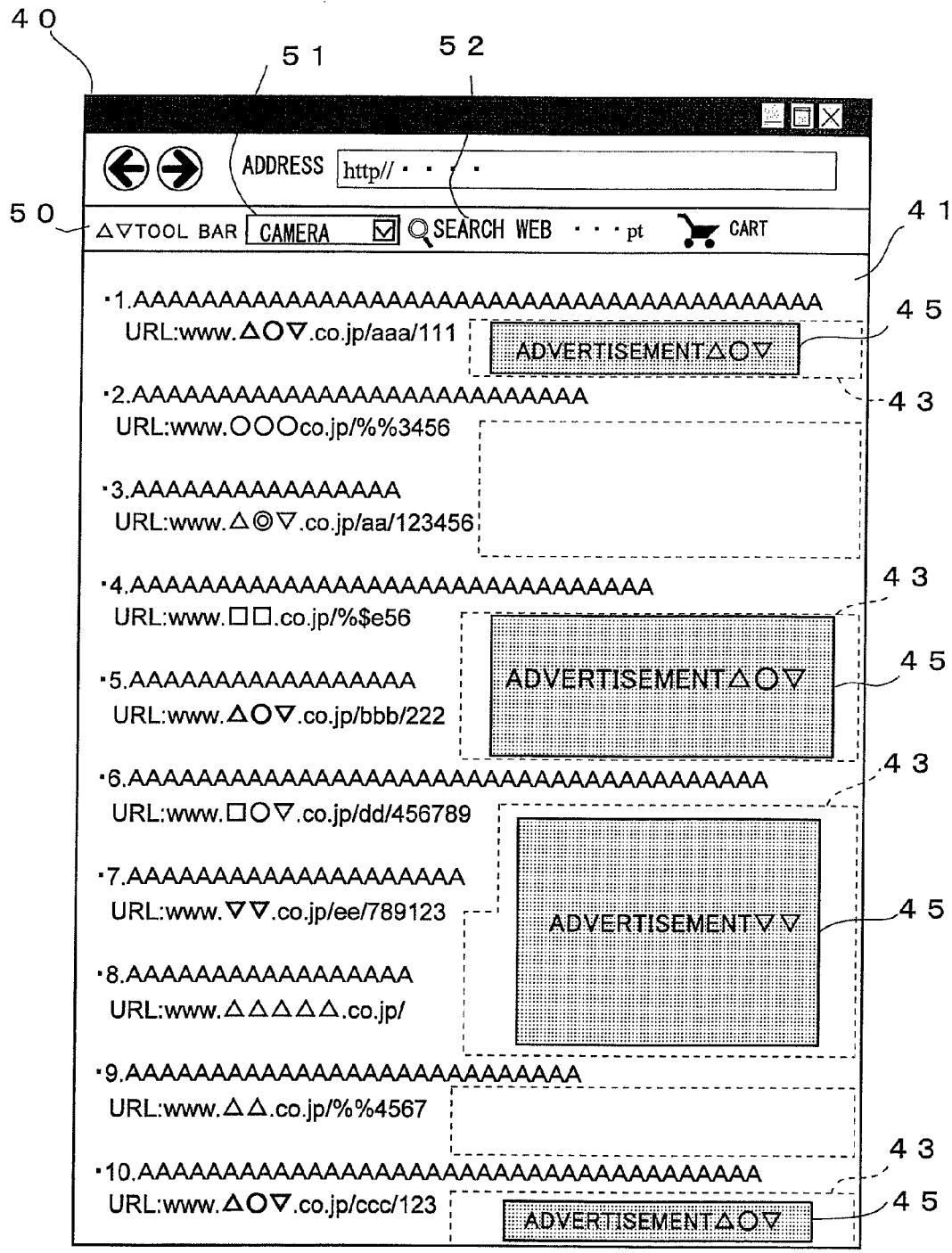
FIG. 9 is a schematic view illustrating an example of display of an advertisement on a web page of FIG. 7.
Figure 10:
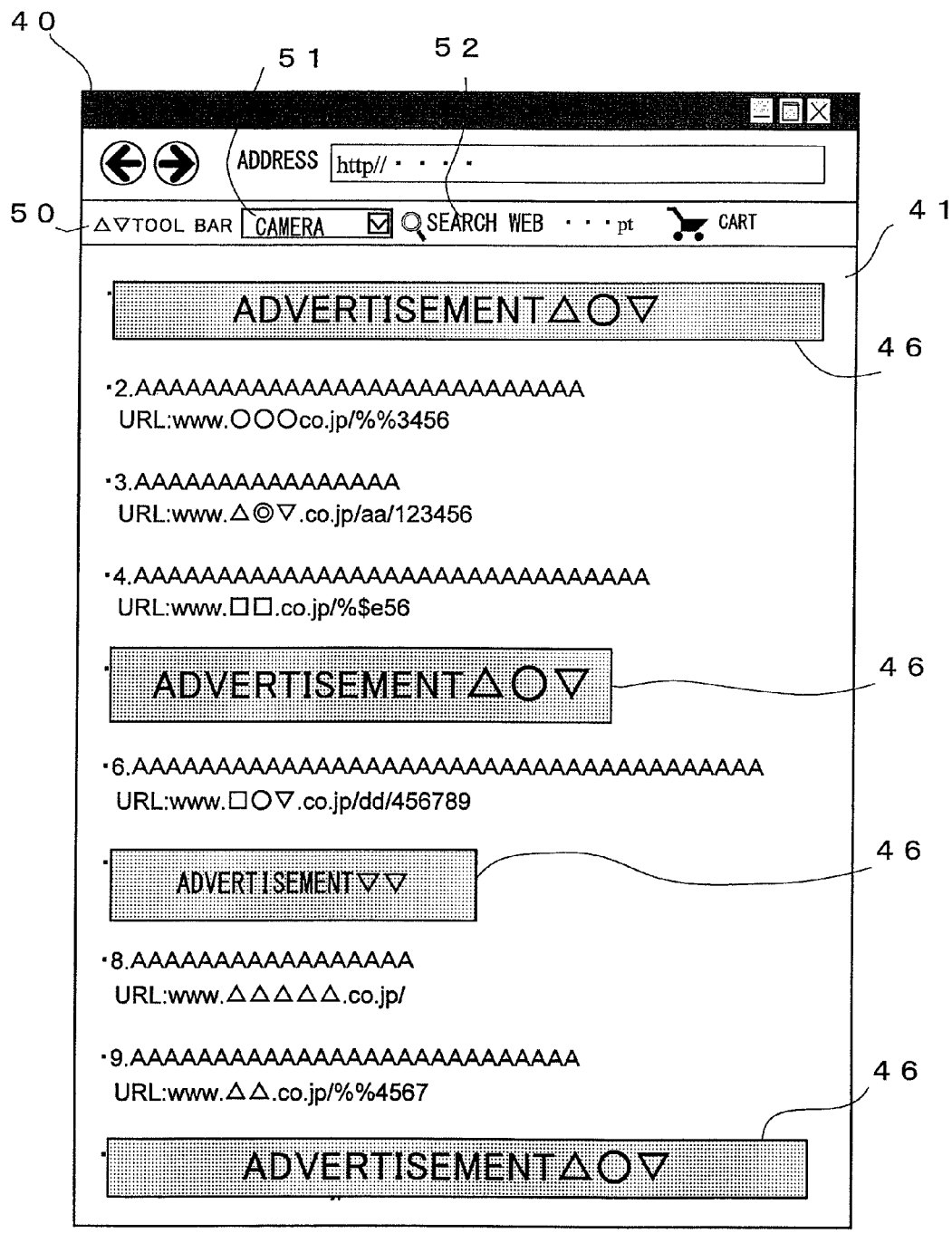
FIG. 10 is a schematic view illustrating another example display of an advertisement on a web page of FIG. 8.

FIG. 6 is a sequence diagram illustrating an example of operation of the advertisement display system 1. FIGS. 7 and 8 are schematic views illustrating examples of web pages displayed on the terminal 30. FIGS. 9 and 10 are schematic views illustrating examples of displays of advertisements on web pages.

First, for example, the tool bar 50 plugged into the web browser of the terminal 30 requests, with a regular interval, the advertisement providing server 10 to transmit character strings and advertisement information.

Next, as illustrated in FIG. 6, the advertisement providing server 10 transmits the character string and the advertisement information (step S1). Specifically, the system control unit 14 of the advertisement providing server 10 looks up the advertisement DB 12a on the basis of the request given by the tool bar 50, and transmits the character string and the advertisement information including information about a display basic size of the advertisement to the terminal 30 via the communication unit 11. For example, in a case of an advertisement of ΔΟ∇ corporation, the system control unit 14 of the advertisement providing server 10 transmits a character string "ΔΟ∇" related to the domain name of the web site of ΔΟ∇ corporation together with advertisement information of ΔΟ∇ corporation. The advertisement providing server 10 also transmits advertisement information and character string (for example, "∇∇") related to another company requesting publication of advertisement in advance.

Next, the toolbar 50 stores the character string and the advertisement information in association with each other (step S2). Specifically, the system control unit 36 of the terminal receives the character string and the advertisement information from the advertisement providing server 10 via the communication unit 31 as the tool bar 50, and stores the character string and the advertisement information thus received to the storage unit 32 or the RAM 36c in association with each other. As described above, the system control unit 36 of the terminal 30 functions as an example of storage means storing the advertisement information and the character string which is set in advance in such a manner that the character string and the advertisement information are associated with each other.

Next, the tool bar 50 obtains an HTML file as a search result (step S3). Specifically, as illustrated in FIG. 7, when the user of the terminal 30 inputs a search keyword to the search keyword input field 51 and specifies the search button 52, the system control unit 36 of the terminal 30 transmits a search query to the search server 7 as the tool bar 50. At this occasion, the system control unit 36 of the terminal 30 also transmits tool bar recognition information for specifying the tool bar 50. Then, as the tool bar 50, the system control unit 36 of the terminal 30 receives an HTML file of the search result in response to the search keyword (an example of display data displayed on the web page) from the search server 7, and stores it to the storage unit 32 or the RAM 36c. As described above, the system control unit 36 of the terminal 30 functions as an example of display data obtaining means that obtains display data displayed on the web page with the web browser.

Next, the advertisement providing server 10 calculates the number of searches for each tool bar (step S4). Specifically, the system control unit 14 of the advertisement providing server 10 calculates the number of searches of the tool bar 50 and the like, in accordance with the received tool bar recognition information. Then, the system control unit 14 of the advertisement providing server 10 transmits the number of searches and the like to the terminal 30.

Next, the web browser 40 obtains an HTML file from the storage unit 32 and the like (step S5). Specifically, as the web browser 40, the system control unit 36 of the terminal 30 obtains the HTML file of the search result stored in the storage unit 32 or RAM 36c (an example of display data displayed in the web page display area 41). In addition, the web browser 40 may obtain the HTML file from the search server 7 in advance and store it to the storage unit 32 or the RAM 36c, and the tool bar 50 may obtain the HTML file stored by the web browser 40.

Next, the web browser 40 displays the web page on the display unit 33 (step S6). Specifically, as the web browser 40, the system control unit 36 of the terminal 30 displays the web page on the display unit 33 on the basis of the obtained HTML file. More specifically, the system control unit 36 of the terminal 30 transmits a video signal, which is to be displayed on the display unit 33, to the display unit 33.

Next, the web page is displayed on the display unit 33 (step S7). As illustrated in FIG. 7, the web page of the search result is displayed in the web page display area 41 of the display unit 33. As described above, the system control unit 36 of the terminal 30 functions as an example of search means that receives input of a search keyword, obtains a search result in response to the search keyword, and displays the search result in the web page display area 41.

Next, the tool bar 50 specifies link information including the character string (step S8). Specifically, as the tool bar 50, the system control unit 36 of the terminal 30 specifies link information including character strings "Δ○∇", "∇∇", and the like obtained from the storage unit 32 or the RAM 36c, from the data of the HTML file obtained in step S3. More specifically, the system control unit 36 of the terminal 30 specifies portions indicating the domain name in portions and the like where linking tags are placed (for example, <ahref="http: // . . . "> . . . </a>) including the obtained character strings "Δ○∇", "∇∇", and the like in the web page. As described above, the system control unit 36 of the terminal 30 functions as an example of link information specifying means that specifies link information including the character strings from the link information included in the obtained display data.

Next, the tool bar 50 specifies the display position where the link information is displayed (step S9). Specifically, the system control unit 36 of the terminal 30 analyzes the data of the obtained HTML file on the basis of the size of the web page display area 41 as the tool bar 50, and as illustrated in FIG. 7, specifies the display position 42 where the link information is displayed in the web page display area 41. As described above, the system control unit 36 of the terminal 30 functions as an example of arrangement position specifying means that specifies a display position where the specified link information is displayed on the screen of the web page.

Next, the tool bar 50 specifies the advertisement display area for displaying the advertisement information, on the basis of the display position where the link information is displayed (step S10). Specifically, as the tool bar 50, the system control unit 36 of the terminal 30 analyzes the data of the obtained HTML file on the basis of the size of the web page display area 41, and as illustrated in FIG. 7, specifies, in proximity to the display position 42, an advertisement display area 43 of a blank area where image data, text data, and the like are not displayed (an example of position related to the display position 42). Alternatively, as illustrated in FIG. 8, the system control unit 36 of the terminal 30 specifies a rectangular advertisement display area 44 including a portion where the link information and information related to the link information (for example, snippet and the like) are displayed (an example of advertisement display area for displaying the advertisement information on the basis of the display position 42). The system control unit 36 of the terminal 30 determines, as the advertisement display area 44, the inside of the rectangular shape or a area adjacent to any one of the frames of the rectangular shape. As described above, the system control unit 36 functions as an example of advertisement display area specifying means that specifies the advertisement display area for displaying the advertisement information on the basis of the specified display position. The system control unit 36 also functions as an example of advertisement display area specifying means that specifies the advertisement display area 43 of the blank area in proximity to the display position. The system control unit 36 also functions as an example of advertisement display area specifying means that specifies, as the advertisement display area 44, the rectangular area including the link information and the information related to the link information. In addition, an example of proximity to the display position where the link information is displayed includes a position close to the link information related to a predetermined character string such as link information including a predetermined character string or a character string similar to the character string rather than link information not related to the predetermined character string.

Next, the tool bar 50 specifies an advertisement corresponding to the character string (step S11). Specifically, the system control unit 36 of the terminal 30 looks up the storage unit 32 or RAM 36c as the tool bar 50, and specifies the advertisement information corresponding to the character string included in the link information specified in step S8.

Next, the tool bar 50 determines whether the advertisement is to be displayed or not (step S12). Specifically, when the number of searches of the tool bar 50 in a predetermined period of time is equal to or more than a predetermined number of searches (threshold value), the system control unit 36 of the terminal 30 determines to display the advertisement information as the tool bar 50. As described above, the system control unit 36 of the terminal 30 functions as an example of advertisement display determining means that determines to display the advertisement information on the basis of the result of the search step. The system control unit 36 of the terminal 30 also functions as an example of advertisement display determining means that determines to display the advertisement information when the number of searches in the predetermined period of time is equal to or more than the threshold value.

Next, the tool bar 50 changes the display size of the advertisement (step S13). Specifically, as the tool bar 50, the system control unit 36 of the terminal 30 changes the display size of the advertisement from the display basic size so that it fits within each advertisement display area 43 or it matches each advertisement display area 44 in accordance with the shape of each of the advertisement display areas 43, 44. As described above, the system control unit 36 of the terminal 30 functions as an example of display size change means that changes the display size of the advertisement information.

Next, the tool bar 50 displays the advertisement in the advertisement display area (step S14). Specifically, as the tool bar 50, as illustrated in FIG. 9, the system control unit 36 of the terminal 30 displays the advertisement 45 corresponding to each character string within each advertisement display area 43. Alternatively, as the tool bar 50, as illustrated in FIG. 10, the system control unit 36 of the terminal 30 displays the advertisement 46 so that it matches each advertisement display area 44. In addition, like banner advertisements, the advertisements 45, 46 have functions for jumping to web pages of links which are clicked.

At this occasion, for example, in the case of FIG. 9, the system control unit 36 of the terminal 30 increases the number of displays so that the number of displays of the advertisement of the character string "Δ○∇" is increased by three, and the number of displays of the advertisement of the character string "∇∇" is increased by one. The system control unit 36 of the terminal 30 also stores the display times, at which the advertisement 45 and the advertisement 46 are displayed, to the storage unit 32 or RAM 36c. As described above, the system control unit 36 of the terminal 30 functions as an example of storage means that stores the display time for each piece of advertisement information.

Next, on the display unit 33, the advertisements are displayed in the portion of the web page in an overlapping manner (step S15). As illustrated in FIG. 9 or 10, the advertisements 45, 46 are displayed on the web page display area 41 of the display unit 33.

Next, the tool bar 50 controls the advertisement display (step S16). Specifically, as the tool bar 50, the system control unit 36 of the terminal 30 determines whether a display continuation time set for each advertisement has elapsed or not since the display time when the advertisement 45 or the advertisement 46 is displayed, and when it is determined that the display time has elapsed, the system control unit 36 of the terminal 30 transmits a signal that causes the advertisement displayed on the display unit 33 to be in the non-display state. As described above, the system control unit 36 of the terminal 30 functions as an example of advertisement information display means that displays the specified advertisement information in the advertisement display area for the predetermined display time.

Next, on the display unit 33, the advertisement is changed to the non-display state (step S17). Specifically, the system control unit 36 of the terminal 30 changes the advertisements 45, 46, of which display time is over, into the non-display state.

Hereinabove, according to the present embodiment, the advertisement information and the character string which is set in advance are stored in association with each other, and the display data displayed on the web page by the web browser 40 are obtained, and from among the link information included in the obtained display data, the link information including the character string is specified, and on the screen (web page display area 41) of the web page, the display position 42 where the specified link information is displayed is specified, and on the basis of the specified display position, the advertisement display area 43 or the advertisement display area 44 for displaying the advertisement information is specified, and the advertisement information corresponding to the character string included in the specified link information is specified, and the specified advertisement information is displayed in the specified advertisement display area 43 or advertisement display area 44, whereby the advertisement display area of the corresponding advertisement information can be changed on the basis of the display position of the specified link information in the web page, and therefore, the effect of the advertisement in the web page can be improved.

Link information of a URL (Uniform Resource Locator) and the like such as "http: //www.△○∇.co.jp/ . . . / . . . / . . . " often briefly includes the character string representing the company name such as "△○∇", and therefore, the advertisement display area can be specified in a more appropriate manner, and the advertisement can be published in a more appropriate manner.

When the advertisement 45 is displayed within the advertisement display area 43 of the vacant area in proximity to the display position 42, i.e., when the blank area in proximity to the display position is specified as the advertisement display area 43, the advertisement 45 corresponding to the link information is more conspicuous than the advertisement 45 displayed alone, and this improves the advertisement effect.

When the advertisement 46 is displayed so that it matches the advertisement display area 44, i.e., when the rectangular area including the link information and the information related to the link information is specified as the advertisement display area 44, the advertisement 46 becomes conspicuous instead of the advertisement display area 44, and this improves the advertisement effect.

In accordance with the contents of the web page, the advertisements 45, 46 are automatically displayed in the advertisement display areas 43, 44 which are the portions where the advertisement effect can be improved in the web page, and therefore, the advertiser and the like of the advertisement information do not need to make setting of, for example, the display position and as to whether the advertisement is displayed under what kind of condition, and the advertiser and the like can easily request the advertisement.

When a determination is made as to whether the specified advertisement information is to be displayed or not, the advertisement can be displayed, e.g., at the portion where the advertisement effect is high and at the time when the advertisement effect is high, on the screen of the web page.

When a determination is made as to whether the advertisement information is to be displayed or not on the basis of the search history such as the tool bar 50, this makes it possible to determine the advertisement information is to be displayed when, for example, the number of searches within the predetermined period of time is equal to or more than a predetermined number of searches. When a user performs searches for the number of times equal to or more than the predetermined number of searches within the predetermined period of time, this may mean that the user cannot obtain effective search result within the same period of time, and the user is likely to continue searching the search target, and accordingly, the user wants useful information about the search target, and therefore, if advertisement information related to the search target is given, the user is more likely to click the advertisement information.

When the specified advertisement information is displayed for the predetermined display continuation time, the advertisement can effectively displayed in accordance with the cost if the display continuation time is determined in accordance with the advertisement price (for example, the higher the advertisement price is, the longer period of time the advertisement is displayed). When only the advertisement of which display period is over is changed to the non-display state, only the valid advertisement can be displayed effectively.

When the display size of the advertisement information is changed, the advertisement display areas 43, 44 are set in proximity to the display positions of the link information which are likely to attract users, and the advertisements of the sizes suitable for the advertisement display areas 43, 44 can be displayed, and therefore, the effect of the advertisement on the web page can be improved.

Next, a modification of specifying of link information including a character string will be explained using FIGS. 11 and 12.

Figure 11:
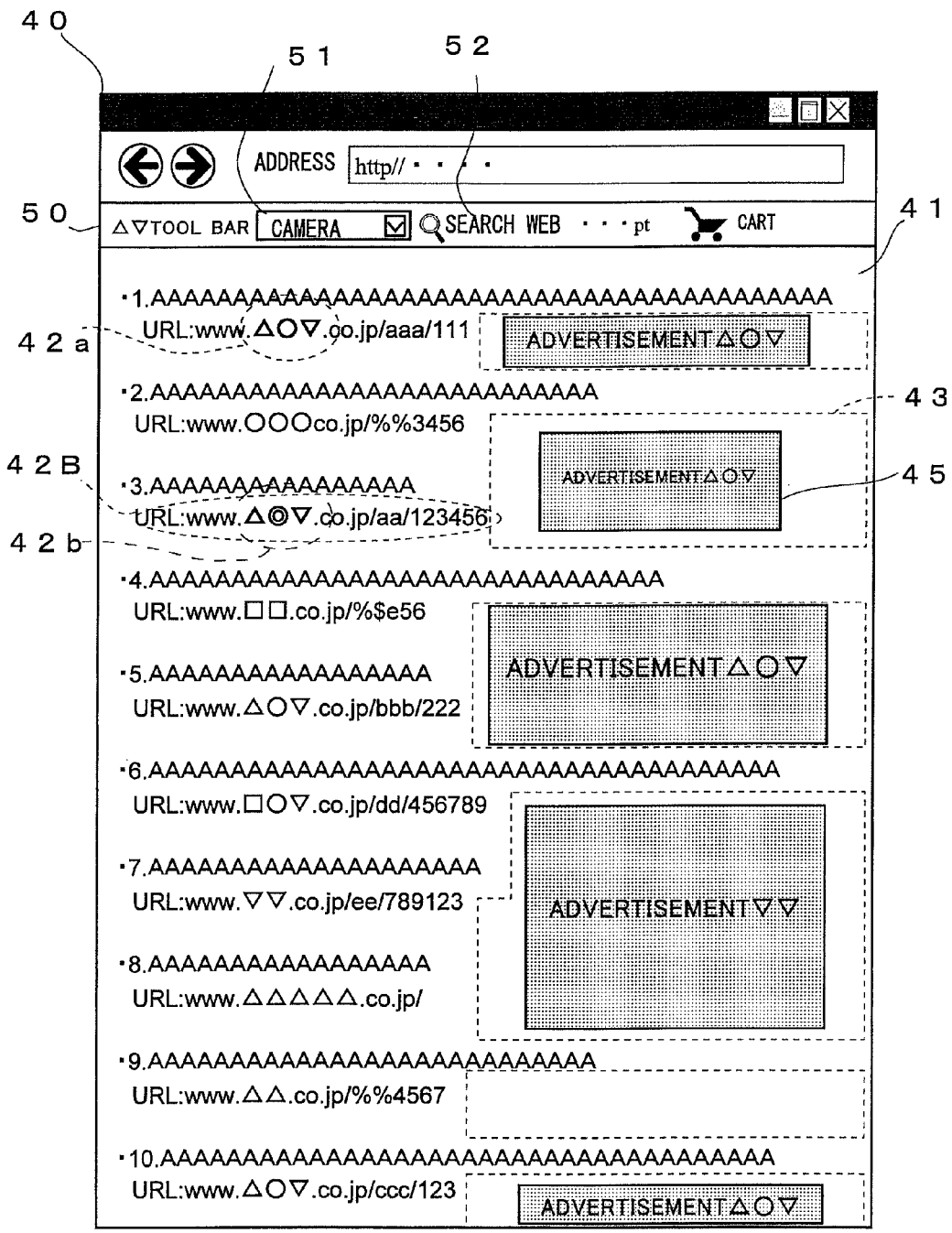
FIG. 11 is a schematic view illustrating an example of display of an advertisement on the web page of FIG. 7.

FIG. 11 is a schematic view illustrating another example of display of an advertisement on a web page. FIG. 12 is a flowchart illustrating a modification of operation of the advertisement display system 1. In addition, in FIG. 12, operation of the advertisement providing server 10, the browser 40, and the like in FIG. 6 are not shown.

As illustrated in FIG. 11, the tool bar 50 also specifies link information (similar link information) 42B including character string "△⊙∇" 42b similar to character string "△○∇" 42a. This similar character string is a character string having similarity of a predetermined range with respect to the character string 42a. Further, in step S10, the tool bar 50 specifies the advertisement display area 43 for displaying the advertisement information on the basis of the display position where the link information is displayed. In step S14, the tool bar 50 displays the advertisement 45 related to the character string "△○∇" in the advertisement display area 43.

Hereinafter, specific operation will be explained on the basis of FIG. 12.

Figure 12:
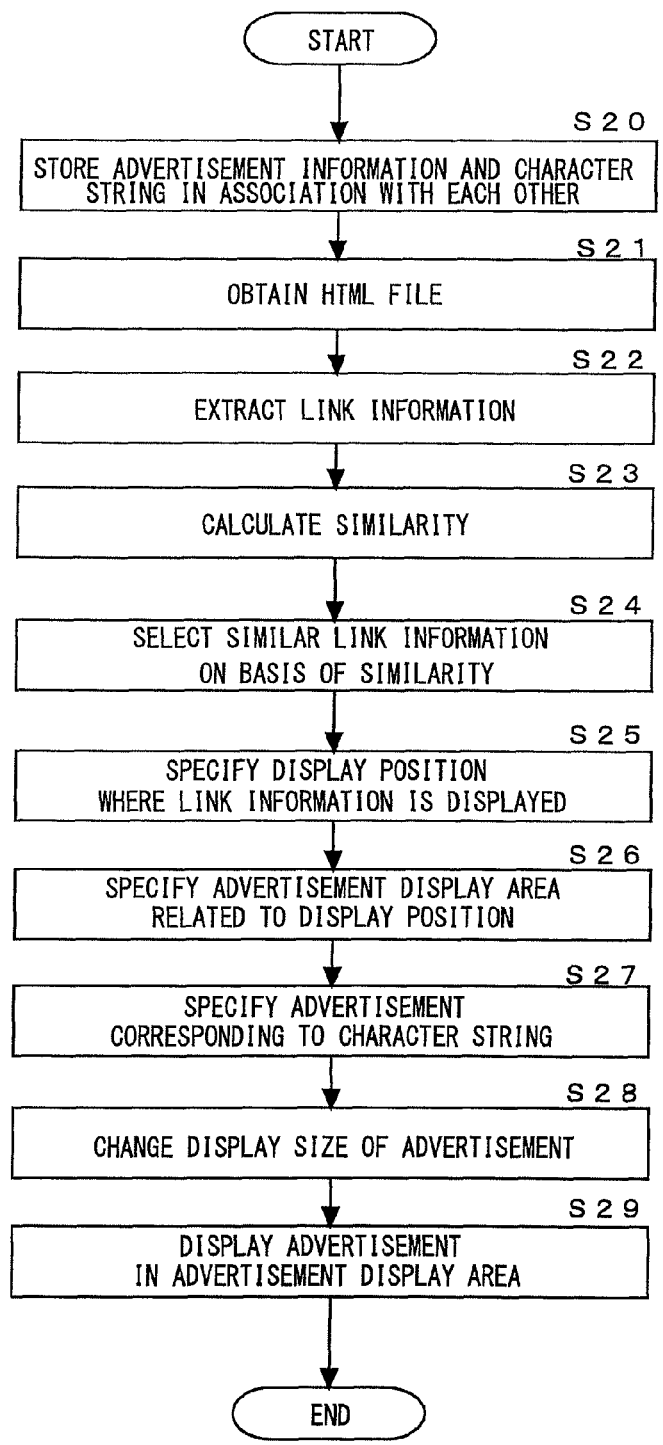
FIG. 12 is a flowchart illustrating a modification of operation of the advertisement display system of FIG. 1.

As illustrated in FIG. 12, like step S2, as the tool bar 50, the system control unit 36 of the terminal 30 receives the character string and the advertisement information from the advertisement providing server 10, stores the character string and the advertisement information in association with each other (step S20), and, like step S3, obtains an HTML file (step S21).

Next, as the tool bar 50, the system control unit 36 of the terminal 30 extracts link information (step S22). For example, as the tool bar 50, the system control unit 36 of the terminal 30 extracts link information such as "http: //www.Δ⊚∇.co.jp/ . . . / . . . / . . . " in a portion of a tag where a link to a web page is provided (for example, <a href= "http: //www.Δ⊚∇.co.jp/ . . . / . . . / . . . "> . . . </a>) from the data of the obtained HTML file.

Next, as the tool bar 50, the system control unit 36 of the terminal 30 generates a partial link character string from the link information. For example, the system control unit 36 reads a character string, which is set in advance, from the storage unit 32 or the RAM 36c, and generates a partial character string by moving the link information, character by character, by the number of characters of the character string which is set in advance. When the character string which has been set has three "characters "Δ○∇", the system control unit 36 successively generates three-character link character string such as "www", "ww.", and "w.∇", from "www.Δ⊚∇.co.jp/ . . . / . . . / . . . " which is subsequent to a scheme name "http: //". In addition, as the tool bar 50, the system control unit 36 may be configured to generate a partial link character string such as "Δ⊚∇" and "abcd" by dividing the link information such as extracted "http: //www.Δ⊚∇.co.jp/ . . . /abcd/ . . . " with delimiters such as "/" and ".". Further, as the tool bar 50, the system control unit 36 of the terminal 30 may be configured to generate a partial link character string by dividing the character string, which is set in advance, with a predetermined number of characters (for example, six characters if it is "camera").

Next, as the tool bar 50, the system control unit 36 of the terminal 30 calculates the similarity between the generated partial link character string and the character string set in advance (step S23). For example, the system control unit 36 calculates each similarity on the basis of the distance between characters of the character string which is set in advance and the generated partial link character string. In addition, examples of similarities include character string distances such as Jaro-Winkler distance, Levenshtein distance, and the like. As described above, the system control unit 36 functions as an example of advertisement display means characterized in determining whether the advertisement can be displayed or not on the basis of the similarity of the similar character string.

Next, as the tool bar 50, the system control unit 36 of the terminal 30 selects similar link information from link information (step S24). For example, when there is a partial link character string (similar character string) of which similarity is beyond a predetermined threshold value, the system control unit 36 selects the link information including the partial link character string as the similar link information. As described above, the system control unit 36 functions as an example of link information specifying means that specifies the link information including the character string similar to the character string from among the link information included in the obtained display data.

Next, as the tool bar 50, the system control unit 36 of the terminal 30 specifies the display position where the similar link information is displayed (step S25). For example, the system control unit 36 analyzes the data of the obtained HTML file on the basis of the size of the web page display area 41, and as illustrated in FIG. 11, specifies the display position 42B where the similar link information is displayed in the web page display area 41.

Next, as the tool bar 50, the system control unit 36 of the terminal 30 specifies the advertisement display area related to the display position like step S10 (step S26). Like step S11, in the character string which is set in advance corresponding to the similar character string, the system control unit 36 of the terminal 30 specifies the advertisement corresponding to the character string which has been set (step S27), and like step S13, the system control unit 36 of the terminal 30 changes the display size of the advertisement (step S28), and like step S14, the system control unit 36 of the terminal 30 displays the advertisement in the advertisement display area (step S29).

As described above, the link information including the character string similar to the character string is specified from among the link information included in the obtained display data, and the similarity of the character string is calculated, and the determination is made as to whether the advertisement can be displayed or not on the basis of the similarity of the similar character string. In this case, the advertisement can be displayed effectively for the display information that includes, in the link information, the similar character string which may be related to the advertisement information.

Next, a modification of determining whether the advertisement is displayed or not in step S12 will be explained using FIG. 13.

Figure 13:
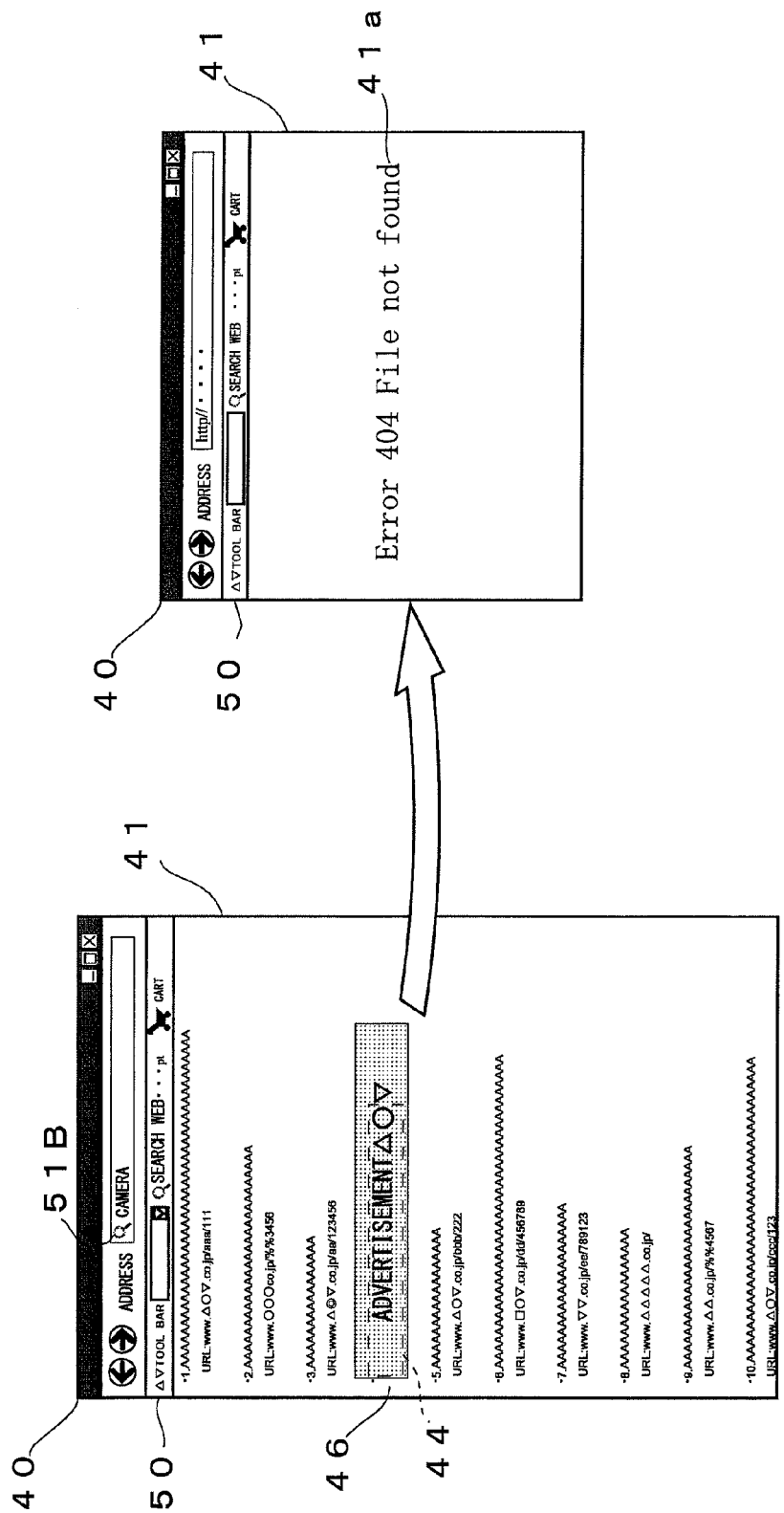
FIG. 13 is a schematic view illustrating an example of relationship between an advertisement displayed on the web page of FIG. 8 and a web page to which the advertisement is linked.

FIG. 13 is a schematic view illustrating an example of relationship between an advertisement displayed on the web page and a web page to which the advertisement is linked.

As illustrated in FIG. 13, when the contents of the web page 41a to which the link information is linked indicate that the link is invalid such a "Error 404 File not found" or the contents are no longer provided, the system control unit 36 of the terminal 30 displays the advertisement information in the advertisement display area 44 of the display of the corresponding link, as the tool bar 50. Then, as the tool bar 50, the system control unit 36 of the terminal 30 displays the advertisement 46 so that it matches the advertisement display area 44 of the display of the corresponding link. As described above, when a determination as to whether the advertisement can be displayed or not is made on the basis of whether the link based on the link information is valid or not, the user is prevented from following the invalid link, and moreover, the invalid portion of the web page is effectively made use of, so that the effect of the advertisement on the web page can be improved.

In addition, as illustrated in FIG. 13, the search result displayed on the web page 41 is a result obtained by inputting a keyword into the search keyword input field 51B and performing search using the search function of the web browser 40. As described above, search may be performed without using the tool bar 50, and the present embodiment can be applied to the search result in response to the search.

Next, another modification of determination as to whether the advertisement is to be displayed or not in step S12 will be explained using FIGS. 14 and 15.

Figure 14:
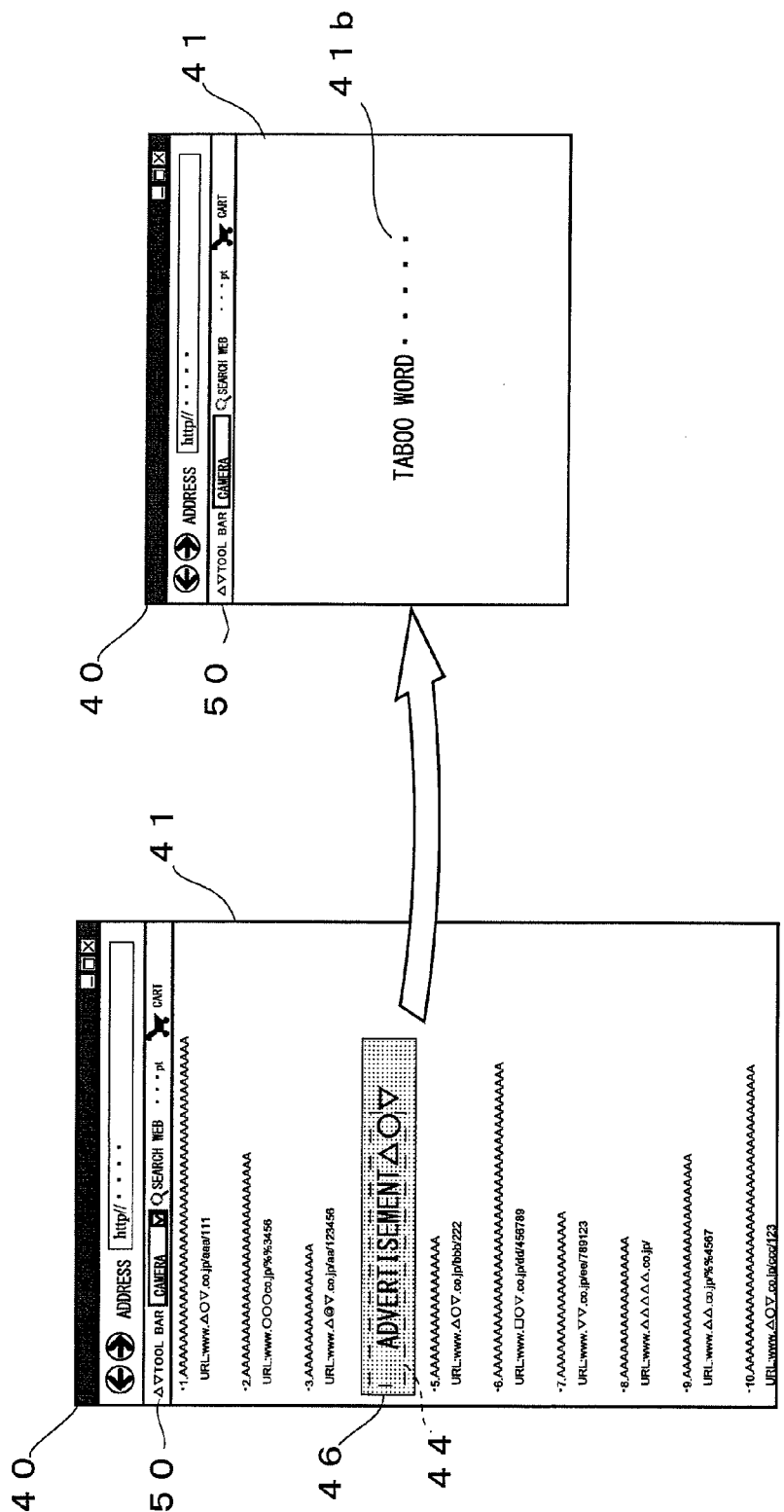
FIG. 14 is a schematic view illustrating an example of relationship between an advertisement displayed on the web page of FIG. 8 and a web page to which the advertisement is linked.

FIG. 14 is a schematic view illustrating an example of relationship between an advertisement displayed on the web page and a web page to which the advertisement is linked. FIG. 15 is a flowchart illustrating another modification of operation of the advertisement display system 1. In addition, in FIG. 15, operation of the advertisement providing server 10, the browser, and the like of FIG. 6 are not shown.

As illustrated in FIG. 14, when the contents of the web page 41b to which the link information is linked include predetermined display prohibited terms and the like which are registered in advance such as "taboo word . . . " as an example of character string which is restricted from being displayed, the system control unit 36 of the terminal 30 determines to display the advertisement information in the advertisement display area 44 of the display of the corresponding link, as the tool bar 50. Then, as the tool bar 50, the system control unit 36 of the terminal 30 displays the advertisement 46 so that it matches the advertisement display area 44 of the display of the corresponding link.

Hereinafter, specific operation will be explained on the basis of FIG. 15.

Figure 15:
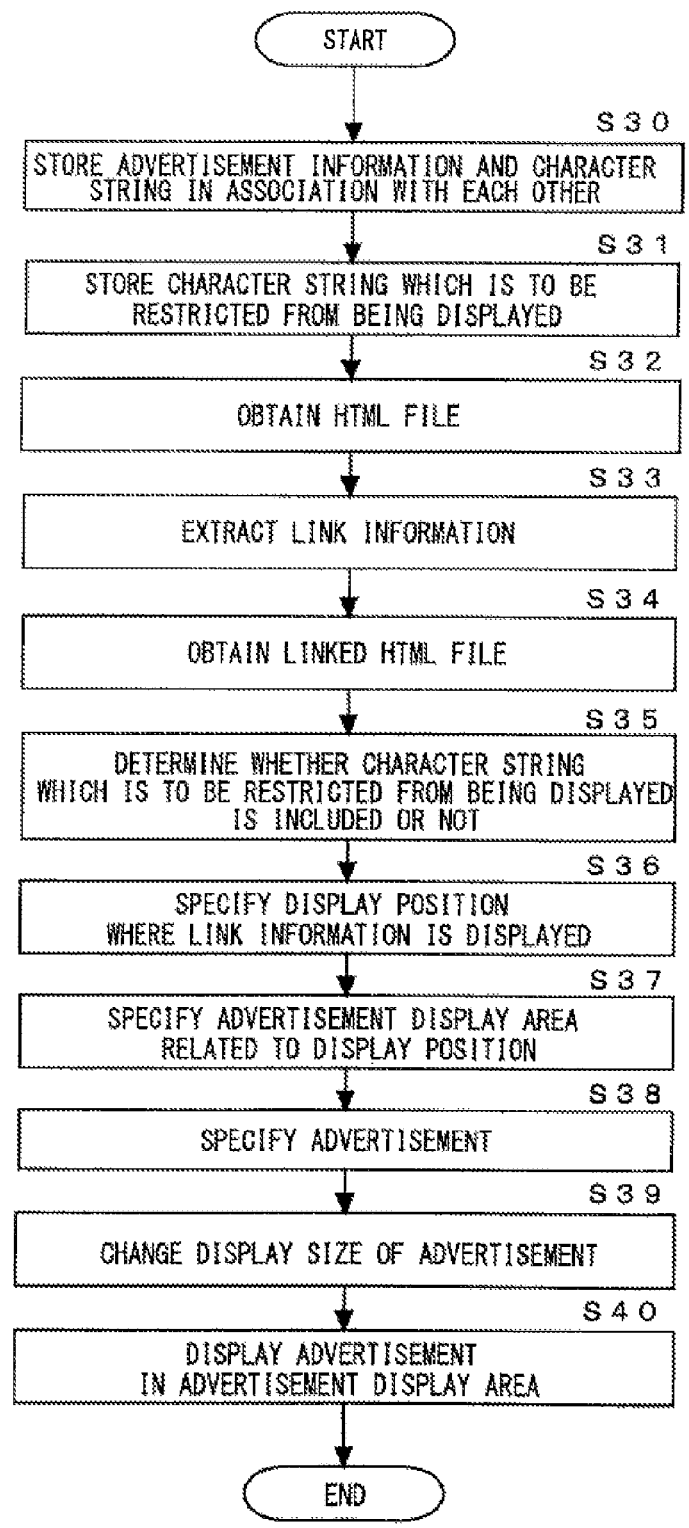
FIG. 15 a flowchart illustrating another modification of operation of the advertisement display system of FIG. 1.

As illustrated in FIG. 15, like step S2, as the tool bar 50, the system control unit 36 of the terminal 30 receives the character string and the advertisement information from the advertisement providing server 10, and stores the character string and the advertisement information in association with each other (step S30).

Next, as the tool bar 50, the system control unit 36 of the terminal 30 receives the character string, which is restricted from being displayed, from the advertisement providing server 10, and stores the character string to the storage unit 32 or the RAM 36c (step S31).

Next, like step S3, as the tool bar 50, the system control unit 36 of the terminal 30 obtains an HTML file (step S32).

Next, as the tool bar 50, the system control unit 36 of the terminal 30 extracts link information from, e.g., a portion of a tag where a link to a web page is provided (step S33).

Next, as the tool bar 50, the system control unit 36 of the terminal 30 obtains a linked HTML file on the basis of the extracted link information (step S34).

Next, as the tool bar 50, the system control unit 36 of the terminal 30 determines whether the linked HTML file includes a character string which is to be restricted from being displayed (step S35). As described above, the system control unit 36 functions as an example of advertisement display determining means that determines whether the advertisement can be displayed or not on the basis of whether the character string stored in the linked destination based on the link information is included or not.

Next, when the character string which is to be restricted from being displayed is included, the system control unit 36 of the terminal 30 specifies the display position where the link information of the web page including the character string which is to be restricted from being displayed is displayed, as the tool bar 50 (step S36).

Next, like step S10, as the tool bar 50, the system control unit 36 of the terminal 30 specifies the advertisement display area related to the display position (step S37).

Next, as the tool bar 50, the system control unit 36 of the terminal 30 specifies the advertisement (step S38). For example, the system control unit 36 of the terminal 30 specifies the advertisement on the basis of the number of times the advertisement information is displayed.

Next, like step S13, as the tool bar 50, the system control unit 36 of the terminal 30 changes the display size of the advertisement (step S39), and like step S14, the system control unit 36 of the terminal 30 displays the advertisement in the advertisement display area (step S40).

As described above, the character string which is to be restricted from being displayed is stored, and the determination as to whether the advertisement can be displayed or not is made on the basis of whether the link destination based on the link information includes the character string which is to be restricted from being displayed. Further, the user is prevented from displaying the link destination which is to be restricted from being displayed to the user, and the invalid portion of the web page can be made use of effectively, and the effect of the advertisement on the web page can be improved.

Next, another example of calculation of the number of times the advertisement is displayed will be explained using FIG. 16.

Figure 16:
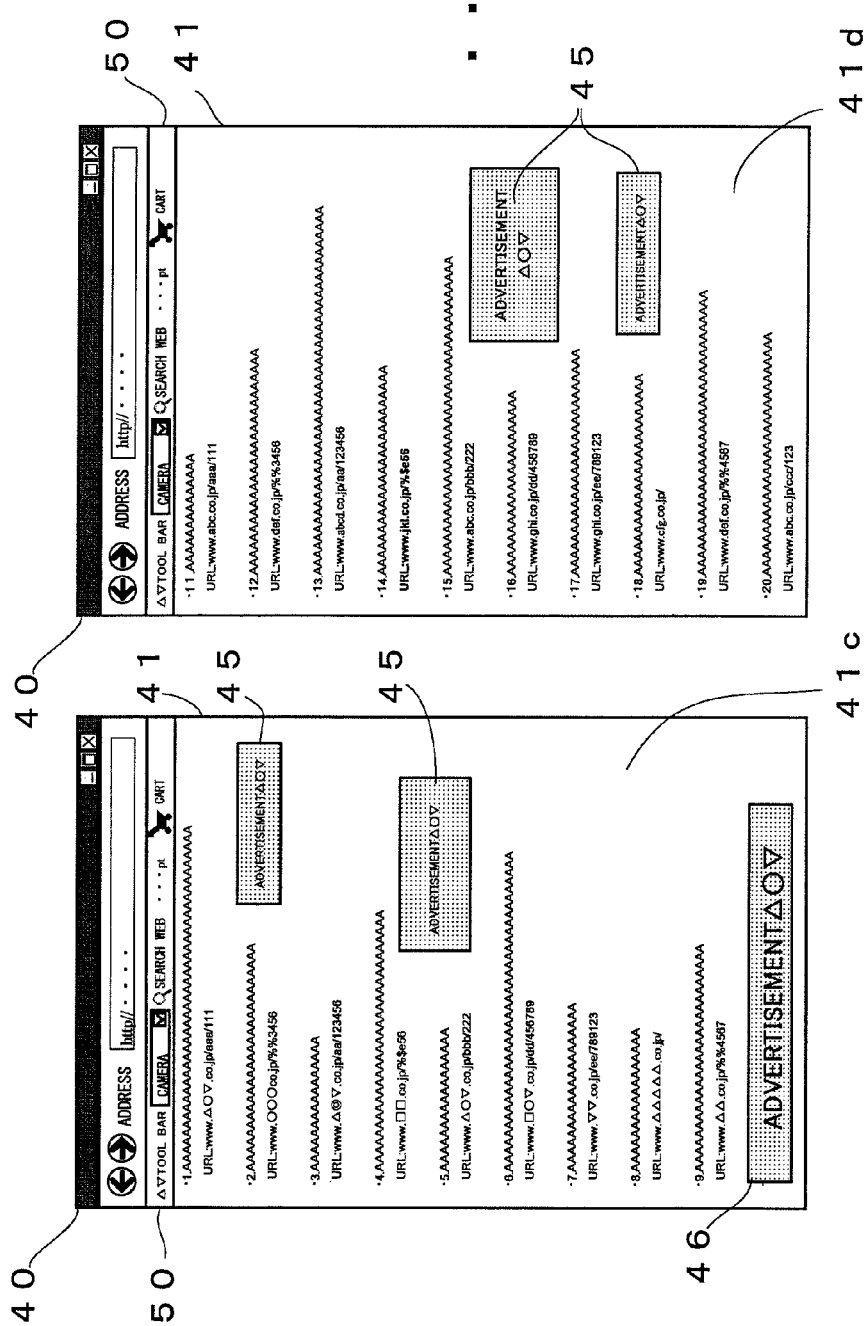
FIG. 16 is a schematic view illustrating another example of the number of times an advertisement is displayed.

FIG. 16 is a schematic view illustrating another example of the number of times an advertisement is displayed.

With the tool bar 50, FIG. 16 shows a search result page 41c including the first to the tenth items of the result set obtained by searching based on a search keyword and a search result page 41d including the eleventh to the twentieth items of the result set obtained by searching based on the search keyword. As the tool bar 50, the system control unit 36 of the terminal 30 calculates, in units of result sets, the number of times the advertisements 45, 46 displayed in the web page display area 41 are displayed, and when the number of times the advertisements 45, 46 displayed in the web page display area 41 are displayed is determined to be more than a predetermined number of times, the system control unit 36 of the terminal 30 determines not to display the advertisement.

As described above, the advertisement information is determined to be displayed where the number of times the advertisement information displayed on the web page included in the result set is displayed satisfies a predetermined condition. In this case, when, for example, the user cannot find the search target and browses various search results, the advertisements 45, 46 can be restricted from being displayed, and therefore, the effect of the advertisement on the web page can be improved.

In addition, in step S12, when a predetermined time elapses since the display time of the web page and the advertisement information when the advertisement is determined to be displayed, the system control unit 36 of the terminal 30 may determine to display the advertisement information. In this case, when the user almost forgets, the advertisement information can be displayed, whereby the effect of the advertisement on the web page can be improved.

Further, when the number of times the advertisement information displayed on the web page is displayed satisfies a predetermined condition, the system control unit 36 of the terminal 30 may determine to display the advertisement information. For example, as the case that the number of times the advertisement information displayed on the screen of the web page is displayed satisfies the predetermined condition, i.e., when the number of times the advertisement corresponding to character strings "△○▽", "△△", and the like is displayed in the web page display area 41 is equal to or less than the predetermined number of times, the system control unit 36 of the terminal 30 determines to display the advertisement information. This can prevent the advertisement from being displayed for the number of times equal to or more than the predetermined number of times and can prevent the advertisement from being displayed excessively to the user, and the effect of the advertisement on the web page can be improved. Further, when the number of times the advertisement is displayed is calculated in units of web pages, the number of times the advertisement is displayed in the web page which the user is viewing can be limited, which prevents the user from being bored, and the effect of the advertisement on the web page can be improved.

In addition, in step S12, the condition as to how much the display size of the advertisement information is to be changed may be set in advance, and on the basis of the condition, the advertisement information may be selected. In this case, if the upper limit and the lower limit of the allowable change of the display size of the advertisement are set as the condition of the change, then, the advertisement is prevented from excessively being reduced from the basic display size which makes it difficult to see the contents of the display of the advertisement, and the advertisement is prevented from being excessively enlarged from the basic display size which reduces the resolution of the image of the advertisement, and the advertisement can be displayed to the user effectively.

Moreover, the system control unit 36 of the terminal 30 may display multiple advertisements in each of the advertisement display areas 43, 44. In this case, the space of each of the advertisement display areas 43, 44 can be made use of effectively, and the effect of the advertisement on the web page can be improved. Further, the size of the advertisement is configured to match the advertisement display areas 43, 44, which can prevent excessive enlargement and reduction.

The web browser 40 which is an agent may have the function of the tool bar 50 by itself. The terminal 30 may execute it in background as a resident program installed to the terminal 30 in advance so that the function of the tool bar can be achieved by the terminal 30.

In search matching advertisement, an advertisement is selected on the basis of a search keyword, but in the present embodiment, selection is not made on the basis of a search keyword. For example, an advertisement related to link information including a predetermined character string (for example, "△○▽"), which is not directly related to a search keyword (for example, "camera"), is selected. In contents matching advertisement, an advertisement is selected on the basis of a keyword included in a product page (a page different from a search result page), and is displayed in the product page (the page different from the search result page), but in the present embodiment, it is displayed in the search result page. For example, the advertisements 45, 46 are displayed in the search result pages displayed in the web page display areas 41.

Further, the present invention is not limited to each of the above embodiments. Each of the above embodiments is an example, and configurations substantially the same as the technical concept described in the claims of the present invention and achieving similar actions and effects are included in the technical scope of the present invention no matter whatever the configurations are.

EXPLANATION OF REFERENCE NUMERALS

1: advertisement display system
10: advertisement display server (server)
30: terminal
42: display position
43, 44: advertisement display area
45, 46: advertisement (advertisement information)
50: tool bar

The invention claimed is:

1. An advertisement display apparatus comprising:
at least one memory operable to store program code, advertisement information and a character string which is set in advance in association with the advertisement information;
at least one processor operable to read said program code and operate as instructed by said program code, said program code including:
display data obtaining code that causes said at least one processor to obtain display data before the display data is displayed with advertisement information on a web page;
link information specifying code that causes said at least one processor to parse link information included in the obtained display data and determine whether the character string is included in a link information among the link information included in the obtained display data and specify the link information that includes the character string, the link information indicating access destination on the Internet;
display position specifying code that causes said at least one processor to specify a display position where the specified link information is displayed after parsing the obtained display data and determining that the character string is included in the link information;
advertisement display area specifying code that causes said at least one processor to specify an advertisement display area for displaying advertisement information on the basis of the specified display position;
advertisement information specifying code that causes said at least one processor to specify advertisement information corresponding to the character string included in the specified link information; and
advertisement information display code that causes said at least one processor to display the specified advertisement information in the specified advertisement display area.

2. The advertisement display apparatus according to claim 1, wherein, the advertisement display area specifying code further causes said at least one processor to specify a blank area in proximity to the display position as the advertisement display area.

3. The advertisement display apparatus according to claim 1, wherein, the advertisement display area specifying code further causes said at least one processor to specify a rectangular area including link information and information related to the link information as the advertisement display area.

4. The advertisement display apparatus according to claim 1 further comprising advertisement display determining code that causes said at least one processor to determine whether the specified advertisement information is to be displayed or not.

5. The advertisement display apparatus according to claim 4, wherein, the advertisement display determining code further causes said at least one processor to determine whether the advertisement can be displayed or not on the basis of whether a link based on the link information is valid or not.

6. The advertisement display apparatus according to claim 4 further comprising a character string storage that stores a character string which is to be restricted from being displayed,
wherein, the advertisement display determining code further causes said at least one processor to determine whether the advertisement can be displayed or not on the basis of whether a link destination based on the link information includes the stored character string or not.

7. The advertisement display apparatus according to claim 4 further comprising similarity calculating code that causes said at least one processor to calculate similarity of the character string,
wherein, the link information specifying code further causes said at least one processor to specify link information including a character string similar to the character string stored in the storage, from among link information included in the obtained display data, the character string included in the link information is considered as being similar to the character string stored in the storage on the basis of a distance between characters of the character string included in the link information and characters in the character string stored in the storage, and
the advertisement display determining code further causes said at least one processor to determine whether the advertisement can be displayed or not on the basis of the similarity of the similar character string.

8. The advertisement display apparatus according to claim 4, wherein, the advertisement display determining code further causes said at least one processor to determine the advertisement information to be displayed when a number of times the advertisement information is displayed on a web page satisfies a predetermined condition.

9. The advertisement display apparatus according to claim 4, wherein the storage further stores a display time for each piece of advertisement information, and
the advertisement display determining code further causes said at least one processor to display the advertisement information when a predetermined time elapses since a display time of a web page, and since the time when the advertisement information to be displayed is determined.

10. The advertisement display apparatus according to claim 2 further comprising search code that causes said at least one processor to receive input of a search keyword, obtain a search result in response to the search keyword, and display the search result,
wherein, the advertisement display determining code further causes said at least one processor to determine the advertisement information to be displayed on the basis of a result from executing the search code.

11. The advertisement display apparatus according to claim 10, wherein, the advertisement display determining code further causes said at least one processor to determine the advertisement information to be displayed when the number of searches from executing the search code within a predetermined period of time is determined to be equal to or more than a threshold value.

12. The advertisement display apparatus according to claim 10, wherein, the advertisement display determining code further causes said at least one processor to determine the advertisement information to be displayed when the number of times the advertisement information is displayed in the web page included in a result set of search from executing the search code satisfies a predetermined condition.

13. The advertisement display apparatus according to claim 1, wherein, the advertisement information display code further causes said at least one processor to display the specified advertisement information for a predetermined display time.

14. The advertisement display apparatus according to claim 1 further comprising display size change code that causes said at least one processor to change a display size of the specified advertisement information displayed in the advertisement display area.

15. The advertisement display apparatus according to claim 3 further comprising a search code that causes said at least one processor to receive input of a search keyword, obtain a search result in response to the search keyword, and display the search result,
wherein, the advertisement display determining code further causes said at least one processor to determine the advertisement information to be displayed on the basis of a result from executing the search code.

16. The advertisement display apparatus according to claim 4 further comprising a search code that causes said at least one processor to receive input of a search keyword, obtain a search result in response to the search keyword, and display the search result,
wherein, the advertisement display determining code further causes said at least one processor to determine the advertisement information to be displayed on the basis of a result from executing the search code.

17. The advertisement display apparatus according to claim 11, wherein, the advertisement display determining code further causes said at least one processor to determine the advertisement information to be displayed when the number of times the advertisement information displayed in the web page included in a result set of search in the search unit satisfies a predetermined condition.

18. The advertisement display apparatus according to claim 2, wherein, the advertisement information display code further causes said at least one processor to display the specified advertisement information for a predetermined display time.

19. The advertisement display apparatus according to claim 3, wherein, the advertisement information display code further causes said at least one processor to display the specified advertisement information for a predetermined display time.

20. The advertisement display apparatus according to 2 further comprising display size change code that causes said at least one processor to change a display size of the specified advertisement information displayed in the advertisement display area.

21. The advertisement display apparatus according to 3 further comprising display size change code that causes said at least one processor to change a display size of the specified advertisement information displayed in the advertisement display area.

22. An advertisement display method for an advertisement display apparatus that displays an advertisement,
the advertisement display method comprising:
a storing step of storing advertisement information and a character string which is set in advance in association with each other;
a display data obtaining step of obtaining display data before the display data is displayed with advertisement information on a web page;
a link information specifying step of parsing link information included in the obtained display data and determining whether the character string is included in a link information among the link information included in the obtained display data and specifying the link information that includes the character string, the link information indicating access destination the Internet;
a display position specifying step of specifying a display position where the specified link information is displayed after parsing the obtained display data and determining that the character string is included in the link information;
an advertisement display area specifying step of specifying an advertisement display area for displaying advertisement information on the basis of the specified display position;
an advertisement information specifying step of specifying advertisement information corresponding to a character string included in the specified link information; and
an advertisement information display step of displaying the specified advertisement information in the specified advertisement display area.

23. An advertisement display system comprising a terminal for displaying an advertisement and a server connected to the terminal via a network and presenting the advertisement, wherein the terminal includes:

at least one memory operable to store program code;

at least one processor operable to read said program code and operate as instructed by said program code, said program code including:

receiving code that causes said at least one processor to receive advertisement information and a character string which is set in advance;

storing code that causes said at least one processor to store the character string and the advertisement information in association with each other;

display data obtaining code that causes said at least one processor to obtain display data before the display data is displayed with advertisement information on a web page;

link information specifying code that causes said at least one processor to parse link information included in the obtained display data and determine whether the character string is included in a link information among the link information included in the obtained display data and specify the link information that includes the character string, the link information indicating access destination on the Internet;

display position specifying code that causes said at least one processor to specify a display position where the specified link information is displayed after parsing the obtained display data and determining that the character string is included in the link information;

advertisement display area specifying code that causes said at least one processor to specify an advertisement display area for displaying advertisement information on the basis of the specified display position;

advertisement information specifying code that causes said at least one processor to specify advertisement information corresponding to a character string included in the specified link information; and advertisement information display code that causes said at least one processor to display the specified advertisement information in the specified advertisement display area.

* * * * *